US007218722B1

(12) United States Patent
Turner et al.

(10) Patent No.: US 7,218,722 B1
(45) Date of Patent: May 15, 2007

(54) SYSTEM AND METHOD FOR PROVIDING CALL MANAGEMENT SERVICES IN A VIRTUAL PRIVATE NETWORK USING VOICE OR VIDEO OVER INTERNET PROTOCOL

(75) Inventors: George W. Turner, Nepean (CA); William J. Noll, Bristol, IL (US); Paul V. Harrington, Naperville, IL (US); Rodger D. Higgins, Aurora, IL (US)

(73) Assignee: Westell Technologies, Inc., Aurora, IL (US)

( * ) Notice: Subject to any disclaimer, the term of this patent is extended or adjusted under 35 U.S.C. 154(b) by 1090 days.

(21) Appl. No.: 09/739,716

(22) Filed: Dec. 18, 2000

(51) Int. Cl.
*H04M 7/00* (2006.01)

(52) U.S. Cl. ............... 379/221.02; 379/211.02; 709/204; 370/352

(58) Field of Classification Search ........... 379/221.13, 379/265.04, 114.1, 201.01, 211.01, 144.01, 379/38, 211.02, 88.01, 221.02; 709/318, 709/229, 204, 227, 248; 455/445, 435.3; 370/352, 338; 705/400
See application file for complete search history.

(56) References Cited

U.S. PATENT DOCUMENTS

| | | | |
|---|---|---|---|
| 4,191,860 A | 3/1980 | Weber ........................ 179/18 |
| 5,247,571 A | 9/1993 | Kay et al. .................. 379/207 |
| 5,422,941 A | 6/1995 | Hasenauer et al. ......... 379/207 |
| 5,463,685 A | 10/1995 | Graechter et al. .......... 379/207 |
| 5,511,111 A * | 4/1996 | Serbetcioglu et al. .... 379/88.01 |
| 5,600,704 A * | 2/1997 | Ahlberg et al. ............. 455/445 |
| 5,768,358 A | 6/1998 | Venier et al. ............... 379/207 |
| 5,892,821 A | 4/1999 | Turner ........................ 379/220 |
| 5,920,619 A | 7/1999 | Karppinen .................. 379/207 |
| 5,930,700 A * | 7/1999 | Pepper et al. ............. 455/435.3 |
| 5,933,483 A | 8/1999 | Pellegrino et al. .......... 379/201 |
| 6,002,759 A | 12/1999 | Kallioniemi et al. ....... 379/220 |
| 6,009,160 A | 12/1999 | Sonnenberg ................ 379/220 |
| 6,014,560 A | 1/2000 | Kramer ...................... 455/414 |
| 6,021,126 A | 2/2000 | White et al. ................ 370/352 |
| 6,088,687 A * | 7/2000 | Leleu .......................... 705/400 |
| 6,252,952 B1 * | 6/2001 | Kung et al. ............... 379/114.1 |
| 6,493,760 B1 * | 12/2002 | Pendlebury et al. ........ 709/229 |

(Continued)

FOREIGN PATENT DOCUMENTS

CA 2269584 11/1999

(Continued)

*Primary Examiner*—Fan Tsang
*Assistant Examiner*—Md S. Elahee
(74) *Attorney, Agent, or Firm*—McDonnell Boehnen Hulbert & Berghoff LLP

(57) ABSTRACT

A system and method for providing call management services in a Virtual Private Network of the present invention uses the advantages of end-to-end Internet Protocol signaling. The system and method of the present invention includes a user profile which offers both a customer address and a user name as search keys. The method includes locating the called party who may be at a multiplicity of possible physical locations, evaluating the calling and called party privileges, routing preferences and busy/idle status for establishing permission to set up the call, determining an optimum route to establish the telephone call. Due to the system and method of the present invention, the telephone call takes the optimum route and preferably the most direct route to the destination with a high probability of completion.

4 Claims, 25 Drawing Sheets

U.S. PATENT DOCUMENTS

| | | | |
|---|---|---|---|
| 6,519,242 B1 * | 2/2003 | Emery et al. | 370/338 |
| 6,629,144 B1 * | 9/2003 | Chu et al. | 709/227 |
| 6,735,292 B1 * | 5/2004 | Johnson | 379/201.01 |
| 6,741,692 B1 * | 5/2004 | Johnson | 379/211.01 |
| 6,751,652 B1 * | 6/2004 | Thomas | 709/204 |
| 2002/0010803 A1 * | 1/2002 | Oberstein et al. | 709/318 |

FOREIGN PATENT DOCUMENTS

| | | |
|---|---|---|
| EP | 0849964 A1 | 6/1998 |
| EP | 0880255 | 11/1998 |
| EP | 0951157 | 10/1999 |
| EP | 0963087 | 12/1999 |
| GB | 2334646 | 8/1999 |
| GB | 2337429 | 11/1999 |
| JP | 11205335 | 7/1999 |
| JP | 11207422 | 8/1999 |
| JP | 11289383 | 10/1999 |
| SE | 9700580 | 8/1998 |
| WO | WO97/33412 | 9/1997 |
| WO | WO98/54868 | 12/1998 |
| WO | WO98/59467 | 12/1998 |
| WO | WO99/05590 | 2/1999 |
| WO | WO99/21109 | 4/1999 |
| WO | WO99/31862 | 6/1999 |
| WO | WO99/38310 | 7/1999 |
| WO | WO99/45679 | 9/1999 |
| WO | WO99/52265 | 10/1999 |
| WO | WO99/55062 | 10/1999 |
| WO | WO99/55066 | 10/1999 |
| WO | WO99/67922 | 12/1999 |

* cited by examiner

SYSTEM AND METHOD FOR PROVIDING CALL MANAGEMENT SERVICES IN A VIRTUAL PRIVATE NETWORK USING VOICE OR VIDEO OVER INTERNET PROTOCOL

FIELD OF THE INVENTION

This present invention relates to a system and method for providing communication services over a network. More specifically, it relates to Call Management Services in a Virtual Private Network using Voice or Video over Internet Protocol.

BACKGROUND OF THE INVENTION

Call Management Services (CMS) allow the calling and called parties to exercise control over call set-up functions within a network. Call set-up includes dialing, wait time and time to move through central offices and long distance services. Typically, there are both originating and terminating versions of these Call Management Services. Originating versions address decisions such as which route to take to complete the call, or what action to take upon encountering a busy signal. Terminating versions include the ability to selectively ignore calls, or route them to a handling mechanism. The handling mechanism provides for a treatment for a call and results in an outcome other than a successful call completion to the desired party. It includes, but is not limited to a busy signal, message service, attendant or administrative assistant answering.

Call Management Services are widely deployed in the Public Switched Telephone Network, having been marketed for many years under the acronym CLASS$^{SM}$, which stands for Custom Local Area Signaling Services. Most private networks, such as Virtual Private Networks (VPN), have deployed proprietary versions of these services, which function in an equivalent manner using capabilities of the current Signaling System 7 (SS7). Virtual Private Networking is a widely deployed generic business service offering which provides customers with a closed user group environment across a plurality of physical locations. There are several subsets of Virtual Private Networking, one of the better-known being Wide Area Centrex (WAC). The CLASS services include Automatic Recall (AR), Automatic Callback (AC), Selective Call Forwarding (SCF), Selective Call Acceptance, Selective Call Rejection (SCR), and the variations thereof. Automatic Callback and Automatic Recall are similar services. Automatic Recall attempts to call back the last party who called the customer, where as Automatic Callback is invoked during an initial attempt by the customer when a busy line is encountered. Automatic Recall is typically not used in private networks since these networks strive to provide a correct disposition for all incoming calls.

Traditional Call Management Services suffer from several serious shortcomings such as:

1) the features are invoked after the network has made major routing decisions, for example, a call is allowed to progress through the network to the called party's line before it is redirected;

2) the features recognize calling and called network interface points or endpoints instead of specific users, making them useless and inappropriate in an environment where users roam amongst a multiplicity of network interface points; 3) the end-to-end signaling capability is limited by antiquated technology; and 4) service portability, the ability to roam while retaining access to personalized CMS features, is not supported.

Several Voice or Video over Internet Protocol (VoIP) telephony solutions have been proposed and/or implemented. However, these solutions tend to emphasize the new capabilities provided by Internet Protocol technology, such as multimedia integration, rather than addressing improvements to existing call-based services. Moreover, these solutions often introduce questionable practices which may undermine the Quality of Service (QoS) to which business customers have become accustomed. Overly aggressive, compression of bandwidth, lack of regard for the scarcity of global Internet Protocol addresses, or alerting the target station or endpoint before call completion is guaranteed are a few examples of some of the issues that result from current solutions.

Therefore, it is desirable to enhance Call Management Services to overcome various shortcomings of the present day services and to extend these enhancements to cover new multimedia calls, without jeopardizing Quality of Service (QoS).

SUMMARY OF THE INVENTION

The system and method of the present invention takes full advantage of end-to-end Internet Protocol signaling in order to enhance Call Management Services capability for both calling and called parties. This is accomplished while allowing the user continued use of a conventional circuit-switched voice transport network, such as the Public Switched Telephone Network (PSTN), to guarantee the Quality of Service (QoS) that Virtual Private Network (VPN) users have come to expect.

The system and method of the present invention users a two-layer numbering scheme. The first or lower layer comprises the Directory Numbers from the North American Numbering Plan (NANP), as assigned by a Local Exchange Carrier (LEC) or a neutral Industry number administrator. These may be, for example, geographic numbers, permanently associated with a specific rate center. This base layer is translated into a physical local Internet address associated with an endpoint or other network termination point within the VPN. The second or higher layer of numbers identifying individual users, are assigned by the customer's administrator, and remain with these users wherever they are located in the network. The Directory Numbers (DN) are also the Network Addresses (NA). The artificial numbers assigned to specific users are the Customer Addresses (CA). A Directory Server performs the translation from Customer Address to Network Address and vice versa.

The system and method of the present invention includes a user profile which offers both the Customer Addresses (CA) and the user name as search keys. These fields are linked and normalized within the signaling mechanism to the CA which allows the calling and called users to opt for the identifier of their choice. In addition, a caller with an appropriate alphanumeric terminal can enter user names instead of Customer Addresses to reach the called party.

In accordance with a preferred embodiment, the method for providing Call Management Services in a Virtual Private Network using Voice or Video over Internet Protocol (VoIP) includes a multi-step process for setting up a call, which is assumed to involve customers located at two different private network switching nodes. It should be noted that VoIP may also include a hybrid call comprising voice, video and data elements. The method includes locating the called party who may be at a multiplicity of possible physical locations at the normal site, or in an environment where users can roam; evaluating the calling and called party privileges, routing preferences, and busy/idle status for establishing permission, herein after known as the matching decision, to set up the call; determining the optimum route, herein after known as the routing decision, and the appropriate technology such as, Voice or Video over Internet Protocol versus Public Switched, or a hybrid of both, Telephone Network (PSTN), to set up the voice and video paths; and establish the voice transport path and matching the actual incoming call with the anticipated call at the terminating network interface point. Only in the final step of this process is there an actual attempt to establish a telephone call in the conventional sense.

Some of the benefits provided by the system and method of the present invention include the call taking the most direct route to the most appropriate destination with a high probability of completion. By offering the option of either IP or PSTN call completion, with equivalent feature functionality. Quality of Service is as good or better than with a traditional circuit-switched Virtual Private Network. Methods are provided to conserve scarce global resources such as PSTN Directory Numbers and global IP addresses.

The foregoing and other features and advantages of the system and method for providing Call Management Services in a Virtual Private Network using Voice or Video over Internet Protocol will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed to a system and method for providing Call Management Services (CMS) in a Virtual Private Network (VPN) using Voice or Video over Internet Protocol (VoIP). It should be noted that "VoIP" refers to voice or video over Internet Protocol, or a hybrid call comprising voice, video, and data elements. Virtual Private Network system and method using Voice over Internet Protocol is described in an application by George W. Turner et al., filed on Aug. 10, 2000 which corresponds to U.S. Ser. No. 09/636,192, the entire teachings of which is incorporated herein by reference.

Call Handling Network Topology

Figure 1:
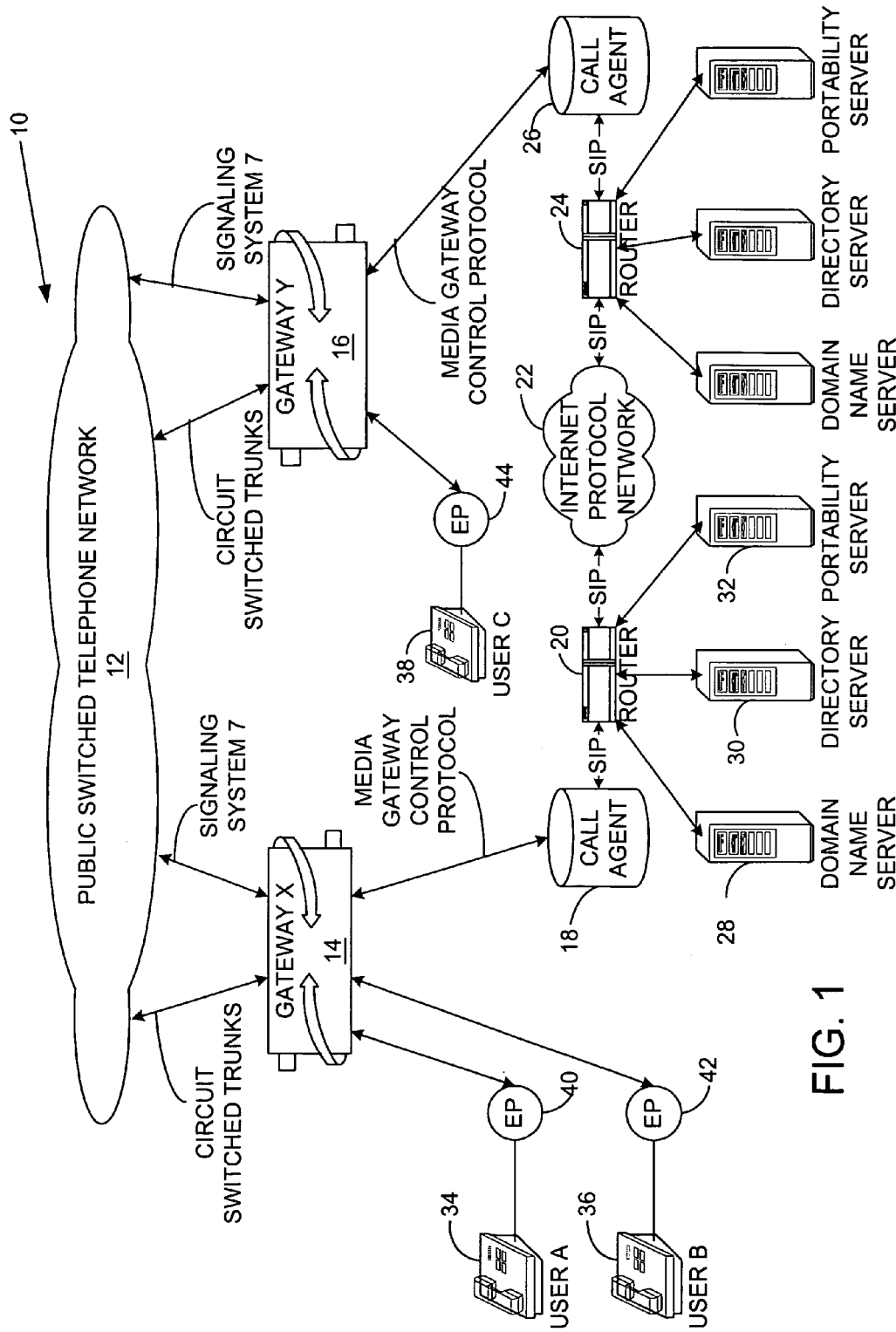
FIG. 1 is a diagram illustrating a preferred embodiment of the network topology of the system for providing Call Management Services in a Virtual Private Network in accordance with the present invention.

FIG. 1 is a diagram illustrating network topology of the system 10 for providing Call Management Services in a Virtual Private Network in accordance with a preferred embodiment of the present invention. The system and method of the present invention describes the handling of calls that originate and terminate within an exemplary Virtual Private Network such as, for example, Centrex. For the sake of demonstrating the features of the system, it is assumed that at least two of the users are at separate network nodes and that the Public Switched Telephone Network (PSTN) circuit-switched network 12 is a call routing option between these nodes. The nodes are assumed to have a one-to-one relationship with PSTN exchanges, and more specifically with a single Centrex switch, although an actual solution is not limited by such constraints. It is further assumed that it is a requirement that callers be identified by number and name, both being addresses that can be called back.

User "A" 34 has a Network Address (NA) of 313-555-2001 and a Customer Address (CA) of 2001. User "B" 36 has a NA of 313-555-2002 and a CA of 2002. User "C" 38 is in a different Numbering Plan Area (NPA) and has a NA of 709-555-3001 and a CA of 3001. Different NPAs are selected to emphasize the geographic separation of parties "A" and "C". In a preferred embodiment, although the last four digits of the NA and the CA are the same for the three users, there is no fixed relationship between the numbers, as is the case with traditional Centrex.

Users "A" 34 and "B" 36 are served by an Internet Protocol (IP) gateway "X" 14 whereas user "C" 38 is served by IP gateway "Y" 16. The gateways depicted herein by a single block may comprise a multiplicity of separate residential and trunk gateways, as well as a separate signaling gateway. Communication between the residential and trunk gateways is via a Real Time Protocol (RTP) running on a managed IP network. For the sake of simplicity, these elements are depicted and are considered to constitute a single VPN network node having one global IP address per customer domain name for person locator services, as well as a single SS7 point code for PSTN signaling. An IP signaling protocol such as Session Initiation Protocol (SIP) handles communications between the call agents 18, 26 in the two gateways 14, 16, via a managed IP network 22. A Media Gateway Control Protocol (MGCG), or equivalent agent to client control protocol, enables control and management of data communications equipment operating at the media gateways 14, 16 using the call agents 18, 26 as media gateway controllers. Thus, the gateways 14, 16 are in communication with their respective call agents 18, 26 using MGCP. MGCP bridges between the circuit-based PSTN and Internet Protocol technology based networks. For further details regarding MGCP, see information available through the Level 3 Communications Website at www.level3.com and the Bellcore Website www.telcordia.com. While the preferred embodiment is described with respect to the use of MGCP, any suitable agent to client gateway control protocol may be used such as the Simple Gateway Control Protocol.

The managed IP network 22 may also support voice associations between the gateways 14, 16 using a suitable Internet RTP. For the sake of simplicity, the transport facility supporting the RTP associations between the gateways 14, 16 has been omitted from FIG. 1. It can be assumed to physically coexist in the aforementioned managed IP network along with the signaling path from gateway 14 to call agent 18, thence from call agent 18 to call agent 26 via paths 20, 22 and 24, and finally from call agent 26 to gateway 16. RTP supports transport of real-time data like interactive voice and video over packet switched networks. RTP, which includes sequence numbers for purposes of reconstructing data in real-time order is used to communicate between the endpoints of users A and B and the respective gateways 14, 16. While any suitable protocol may be used, the media (i.e., the voice signal) is preferably transported using RTP, which itself is carried inside of a User Datagram Protocol (UDP). RTP is described in H. Schulzrinne et al., "RTP: A Transport Protocol for Real-Time Applications," IETF RFC 1889, January 1996, which is incorporated herein by reference.

In traditional wireline PSTN networks, the first six digits of a NA i.e., the NPA-NXX are permanently associated with a particular gateway; they never roam from the assigned IP gateway. Thus, they can be used for network routing amongst IP gateways without the need to consult a database or directory server. In a particular embodiment, if the private network is global, the NAs may have a prefix for "country codes".

In a particular embodiment, global IP addresses are only assigned on the basis of one per customer per gateway. This strategy is intended to alleviate the critical shortage of IP point codes. Addressed used for particular endpoints are local. Thus, a SIP redirection server capability for a person locator service is impractical because such servers are required to return global IP addresses, and the local IP addresses used herein would be meaningless. Instead, a SIP proxy server is incorporated in a preferred embodiment of the system 10 of the present invention. Because the basic SIP functionality of query state awareness is enhanced to allow short-term awareness of calls in progress, the functionality is identified as that of a "person locator server" instead of a SIP proxy server. This person locator function is provided amongst a multiplicity of networks and a SIP message is sent to different networks or different endpoints within a network to locate a particular user.

In a particular embodiment, traffic carried over the managed IP network is prioritized according to a method that gives signaling messages highest priority, followed by real-time voice and then real-time video packets. Data not associated with calls in progress is assigned the lowest priority. Signaling has the highest priority because of its essential role in eliminating congestion by taking down calls; voice is next because packet delays result in noise and distortion that is extremely noticeable to users of this traditional lifeline service; video is more forgiving because the most recent image can be retained until information is available to update it. Network throughput is provisioned so that the transmission rates for data are acceptable, except in rare and unusual circumstances. The average delay of the lowest priority service is monitored and the results are used to assist in routing decisions, as are described herein after.

The conversion from a CA to a NA and vice versa takes place in a Directory Server 30. This Directory Server 30 is fully replicated at each gateway 14, 16. Changes in the associations between CAs and NAs are immediately propagated to all servers, allowing roaming users to be accommodated. In a particular embodiment, the server associated with the gateway where the user and/or system administrator is physically located, at the time of a status change, serves as the master for updating all other servers. One server is designated as the master for periodic network audits. It is considered impractical for the Directory Servers to be aware of per-call transient data such as the busy/idle status of network termination points or endpoints 40, 42, 44. Thus, while the Directory Servers can accommodate roaming users, they cannot give a final NA. In a preferred embodiment, this assignment is performed by the call agent 18, 26 in the destination gateway, acting on pre-programmed instructions provided to it by a Directory Server 30. The Domain Name Server 28 translates a Network Address or Internet name into a local Internet address which identifies the physical termination or endpoint within the network. The Domain Name Server 28 is replicated at each gateway 14, 16. A Portability Server 32 is also replicated at each gateway 14, 16. The Portability Server 32 provides the ability for a customer to take his telephone number from one physical location to another. The Portability Server 32 interacts with a user who is in the process of moving from one physical location to another. It authenticates the request to port by prompting the user to log on, then matching the user-supplied name and password with data on file. If successful, it packages the necessary porting data and sends it to the Directory Server as a dynamic update.

Figure 2A:
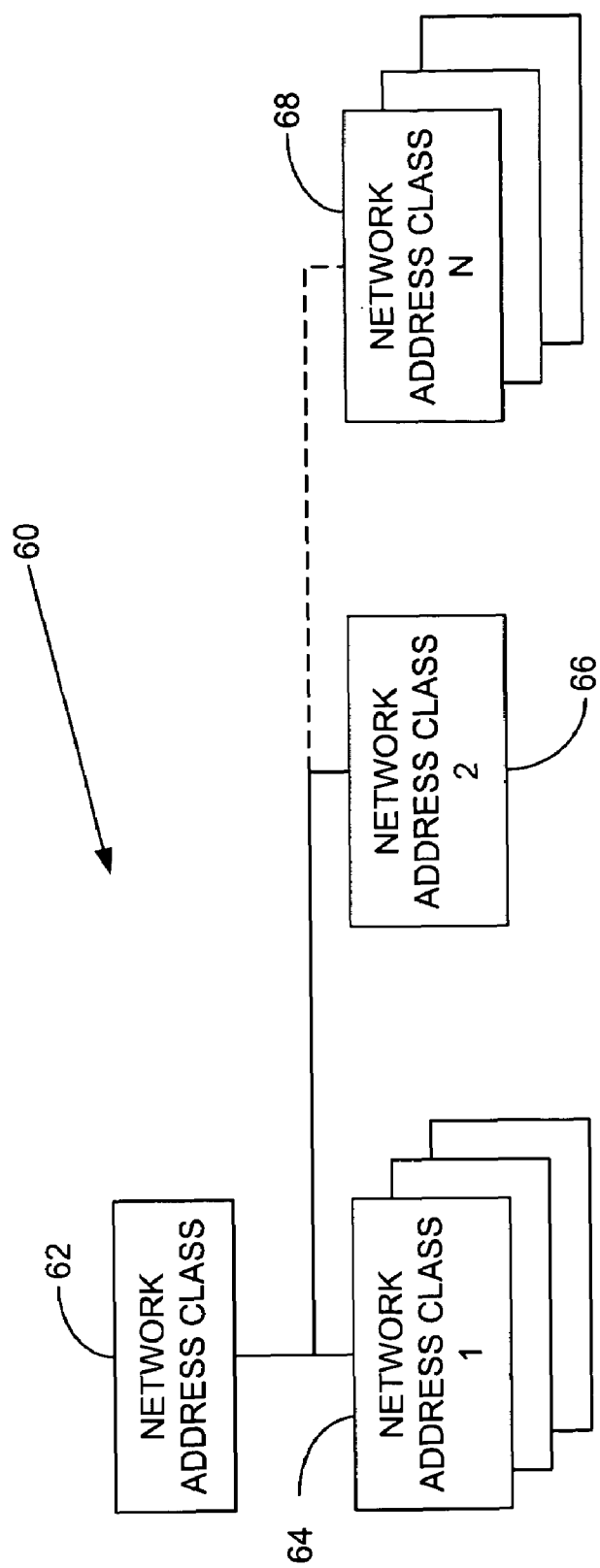
FIGS. 2A and 2B are diagrams illustrating the Directory Server data structure in accordance with a preferred embodiment of the present invention.
Figure 2B:
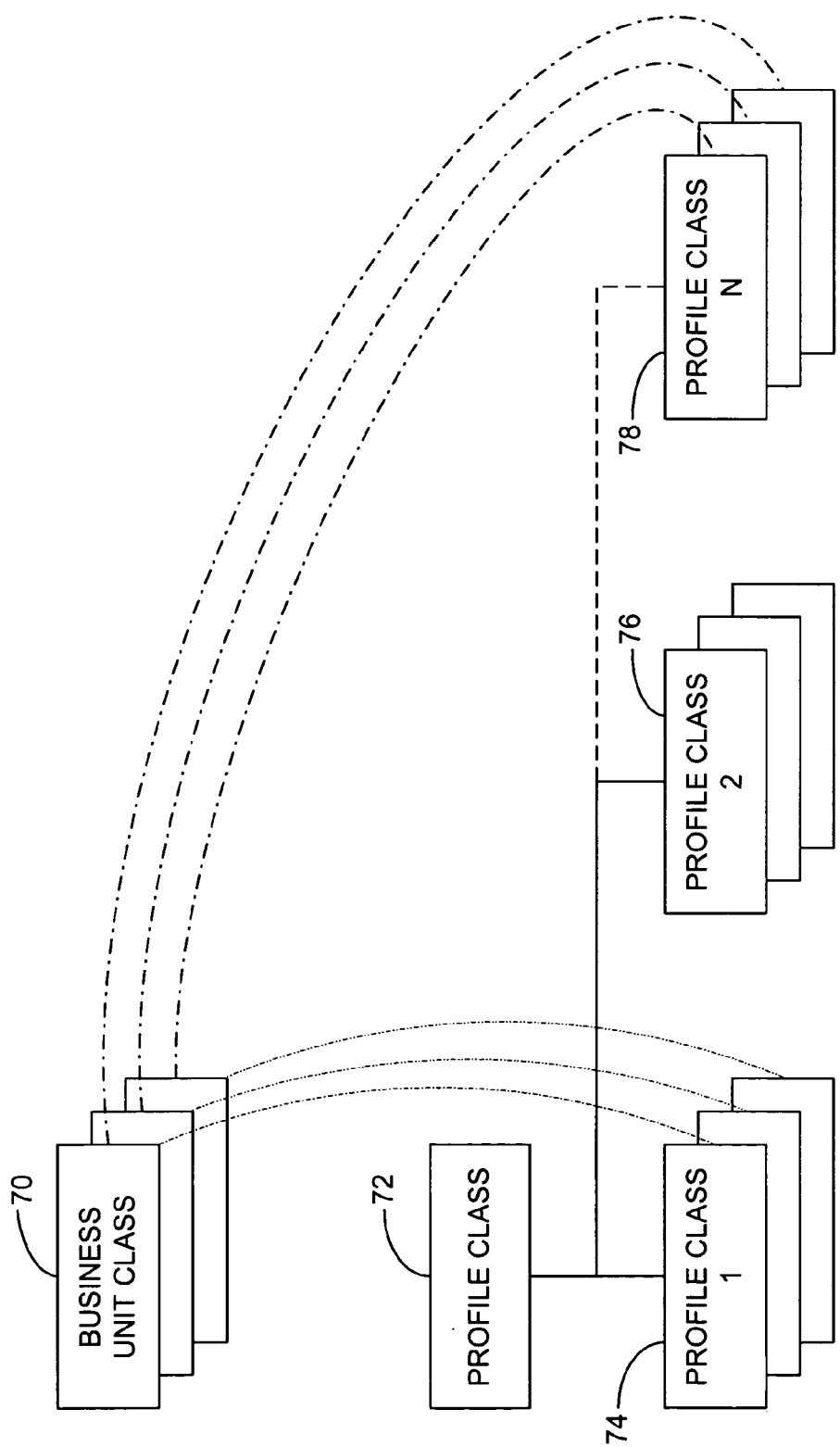

FIGS. 2A and 2B are diagrams illustrating the Directory Server data structure in accordance with a preferred embodiment of the present invention. The Directory Server 30 contains classes of objects and attributes of objects in some case that can be defined as follows:

● Network Address (NA) Class 62: There is one NA object 64, 66, 68 for every recognized customer termination or endpoint 40, 42, 44. The instance record contains attributes describing key capabilities of the termination such as, but not limited to, whether it is on or off the network, the feature set that can be supported, and data bandwidth. The record also contains two flags, one of which is set if the assigned user has roamed to another location, and the other if the endpoints or network termination points currently have an active guest user. There are fields for the currently active CA which is important to the process of translating from NA to CA, and the assigned CA. It should be noted that the two CAs are the same, unless a guest user is present.

● Master Logic Tree: This is the stem class for the configuration classes which follow.

● Configuration Classes: Built on the Master Logic Tree super class, the Configuration Classes are provided by the equipment vendor to represent a suite of likely CMS feature configurations. In a particular embodiment, these pre-packaged suites are selected by the system administrator as the foundation for the Business Unit Profile. All that the system administrator needs to do is fill in a few key attributes that apply to all users within the Business Unit. The sizes of lists and tables are examples of such attributes.

● Business Unit Profile 70: The Business Unit (BU) is the smallest definable entity to be independently managed by the customer's system administrator. Business Unit Profiles are object instances of the aforementioned Configuration Classes. They are at the base of a hierarchy comprised of, but not limited to, sections, districts, and departments or other organizational entities. A reference number tracks their position in the hierarchy. Additional levels can be inserted if required. The data record contains attributes describing the feature set available to users within the BU, a template describing how the originating and terminating CMS features should interact, data shared by all BU members such as master speed call lists, and other capabilities considered convenient to be managed at the BU level. This profile yields graphical displays such as logic trees for the "Matching Decision Tree" and the "Routing Decision Tree", which are described herein after.

● User Profile 72: There is one user profile object 74, 76, 78 for each recognized user in the customer's organization. Sub-classes are used to denote the user's status and privileges, and special sub-classes are available for assignment to endpoints where a telephone can be connected in public areas or conference rooms. The instance record can contain a large number of attributes, of which only a few are essential to the description of the exemplary embodiments that follow. The most important of these is the CA, which is defined separately herein after. This is followed by the NA where the user is currently located and the assigned NA, the former being the key to the CA to NA translation. In a preferred embodiment, the two NAs are the same, unless the user has roamed to another location. A flag is set if the current NA is not the user's assigned NA. A reference number is another attribute in the user profile that ties the user to a specific Business Unit Profile. A public and several private name fields follow. These are followed by personal data for the features identified in the business unit profile. The business unit profile includes, but is not limited to, a personal speed call list and selective call forwarding. A speed call list allows the user to have a list of eight numbers. The actual numbers to be used, if any, appear in the user's profile. Selective call forwarding allows, for example, the use to identify and forward numbers or CA's up to a limit established by the administrator in the BU profile. The actual numbers to be forwarded, as well as the forwarded to numbers appear in the user's profile. Data entered into the user profile is constrained by the business unit profile, particularly in terms of table entry size and permissible number ranges. Other personal data are likely to be required, such as passwords for remote access when requesting a service port.

● Customer Address (CA): This is an attribute of the user profile object. It has special significance because of its role as a search key in translations between network addresses and user profiles.

Figure 3:
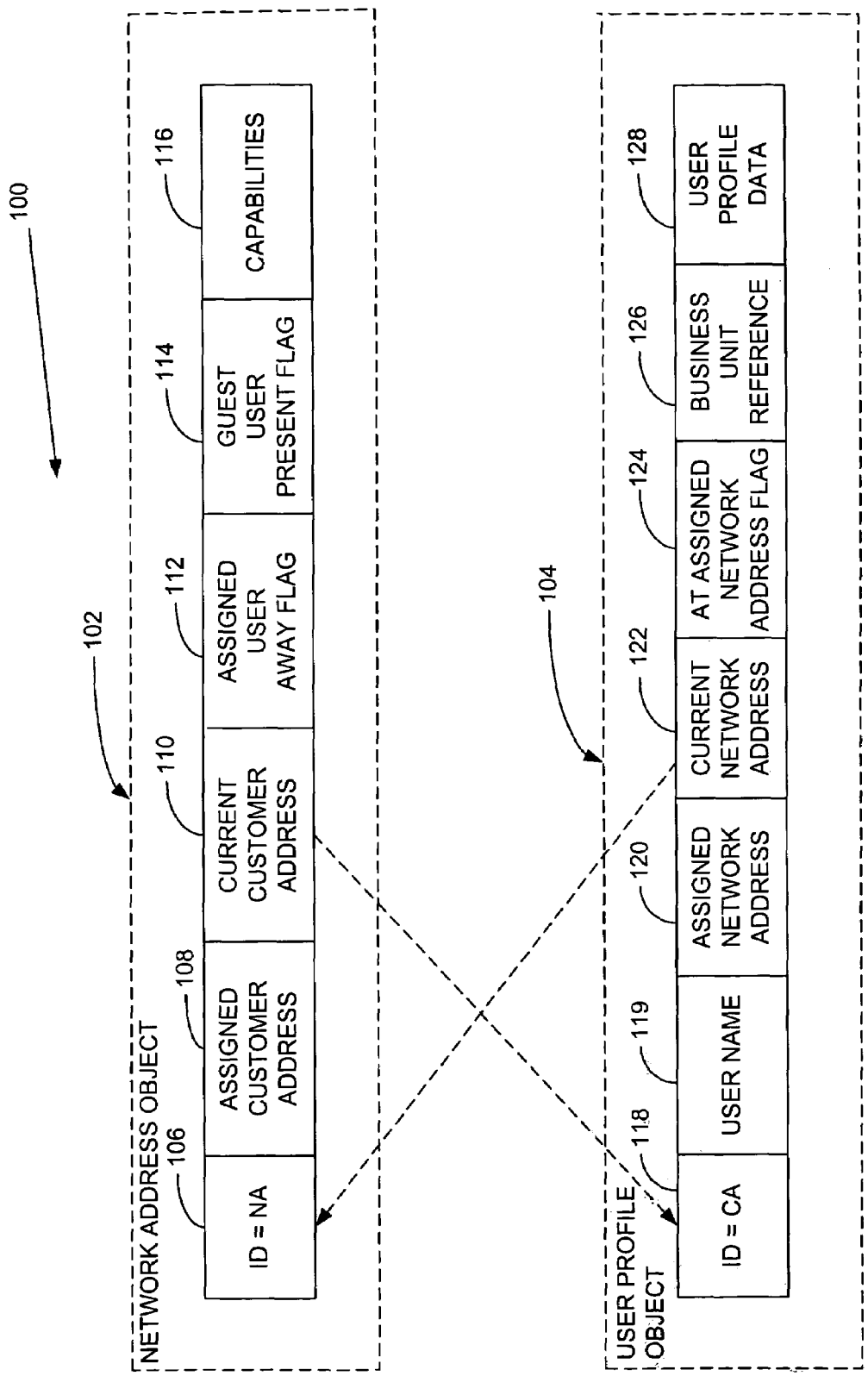
FIG. 3 is a diagram illustrating Directory Server translations and attribute fields in accordance with a preferred embodiment of the present invention.

FIG. 3 is a diagram illustrating Directory Server translations and attribute fields in accordance with a preferred embodiment of the present inventions. The key attributes of the NA object 102 and user profile object 104 can be arranged as fields in a data record associated with the object instance. The dashed lines are cross-references for the translations: the current customer address attribute 110 of the NA object 102 points to the appropriate user profile object 104; conversely, the current network address attribute 122 of the user profile object 104 points to the appropriate network address object 102.

In a particular embodiment, the primary search key for a NA is the Directory Number assigned by the serving Local Exchange Carrier (LEC) or neutral third party number administrator. This is the ID field, identified as ID 106. The user profile object 104 has two search keys, the ID field ID 118 and the user name 119. The ID field ID 118 contains the CA, and in a particular embodiment is the primary key for use by intra-VPN queries. In another preferred embodiment, off network queries in IP mode can use the user name field 119 as a search key, such as in SIP: johnsmith@bigcorp.com.

There are four sources of data for a typical internal call involving two parties—the two CAs and their associated user profiles, plus the two NA's and the physical endpoint descriptions they contain. The Directory Server has access to the data in the four sources during the course of a transition. This data is sufficient to complete the translation function for most calls. The exceptions are addressed by the Matching Decision Tree described herein after.

All calls, for example, user to user, user to PSTN, and PSTN to user, are processed by the Directory Server (DS) before they can be completed. Once this processing has been carried out, a "DS" flag is set so that subsequent queries to a Directory Server, if required for other reasons, do not perform the CA/NA translations. Segment's added to established calls for adding additional capabilities in a multimedia environment, transferring, forwarding, or conferencing are treated as new calls. In a preferred embodiment, call agents are not permitted to perform final routing to an IP network endpoint unless the DS flag on the incoming call has been set. This is a Quality of Service (QsS) safeguard intended to avoid completion of mishandled calls. Calls from NAs with no assigned CA are not permitted. In a particular embodiment, such call attempts may be default routed to the system administrator for assignment of a CA.

Processing System

An operating environment for the system 10 includes a processing system with at least one high speed processing unit and a memory system. In accordance with the practices of persons skilled in the art of computer programming, the present invention is described with reference to acts and symbolic representations of operations or instructions that are performed by the processing system, unless indicated otherwise. Such acts and operations or instructions are sometimes referred to as being "computer-executed", or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readably by the processing unit. The computer readable medium includes cooperating or interconnected computer readable media, which exist exclusively on the processing system or is distributed among multiple interconnected processing system that may be local or remote to the processing system.

Basic Call Setup

Intra-Gateway

Figure 4A:
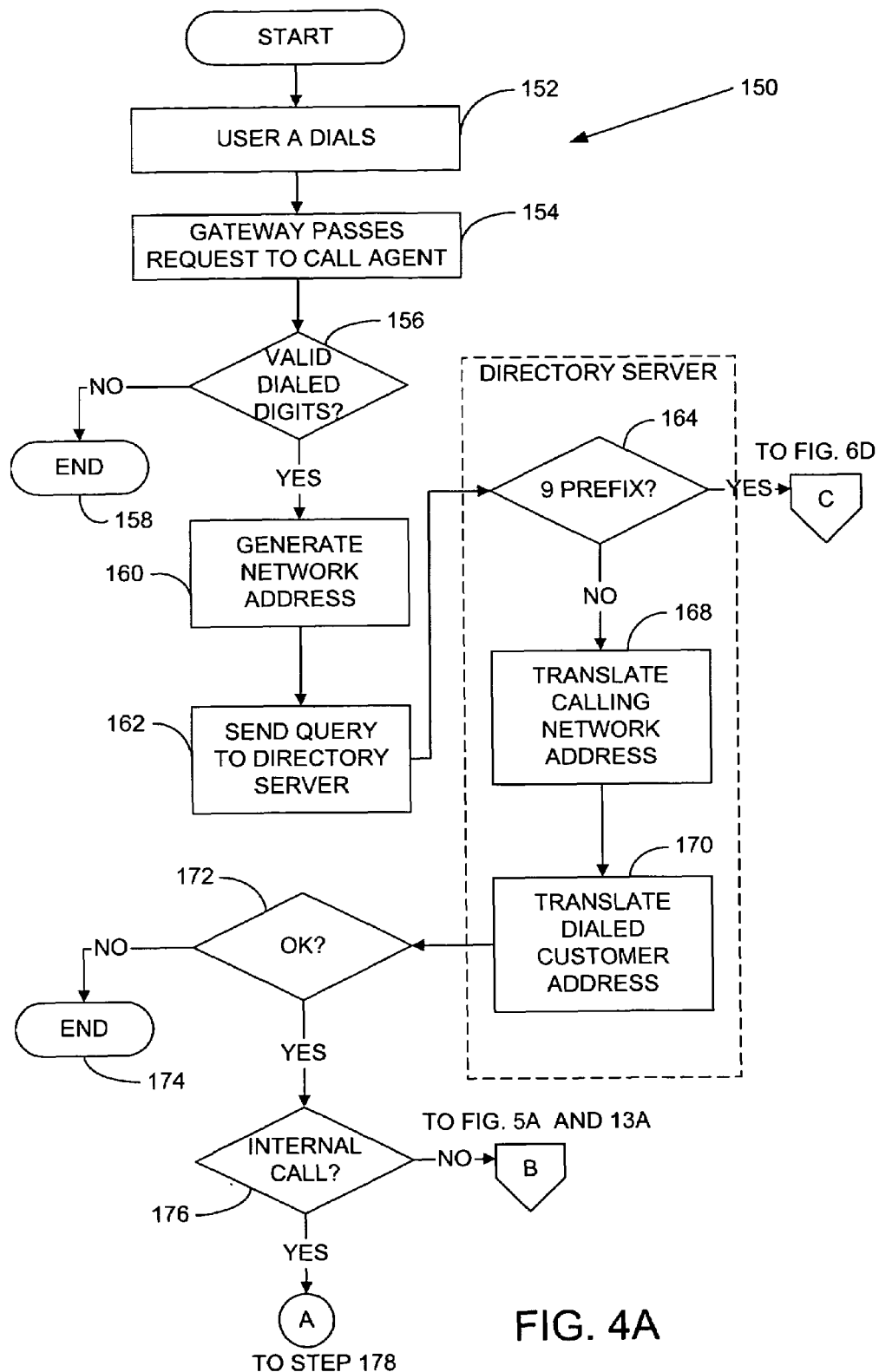
FIGS. 4A–4C are flowcharts illustrating a method for handling intra-gateway calls in accordance with a preferred embodiment of the present invention.
Figure 4B:
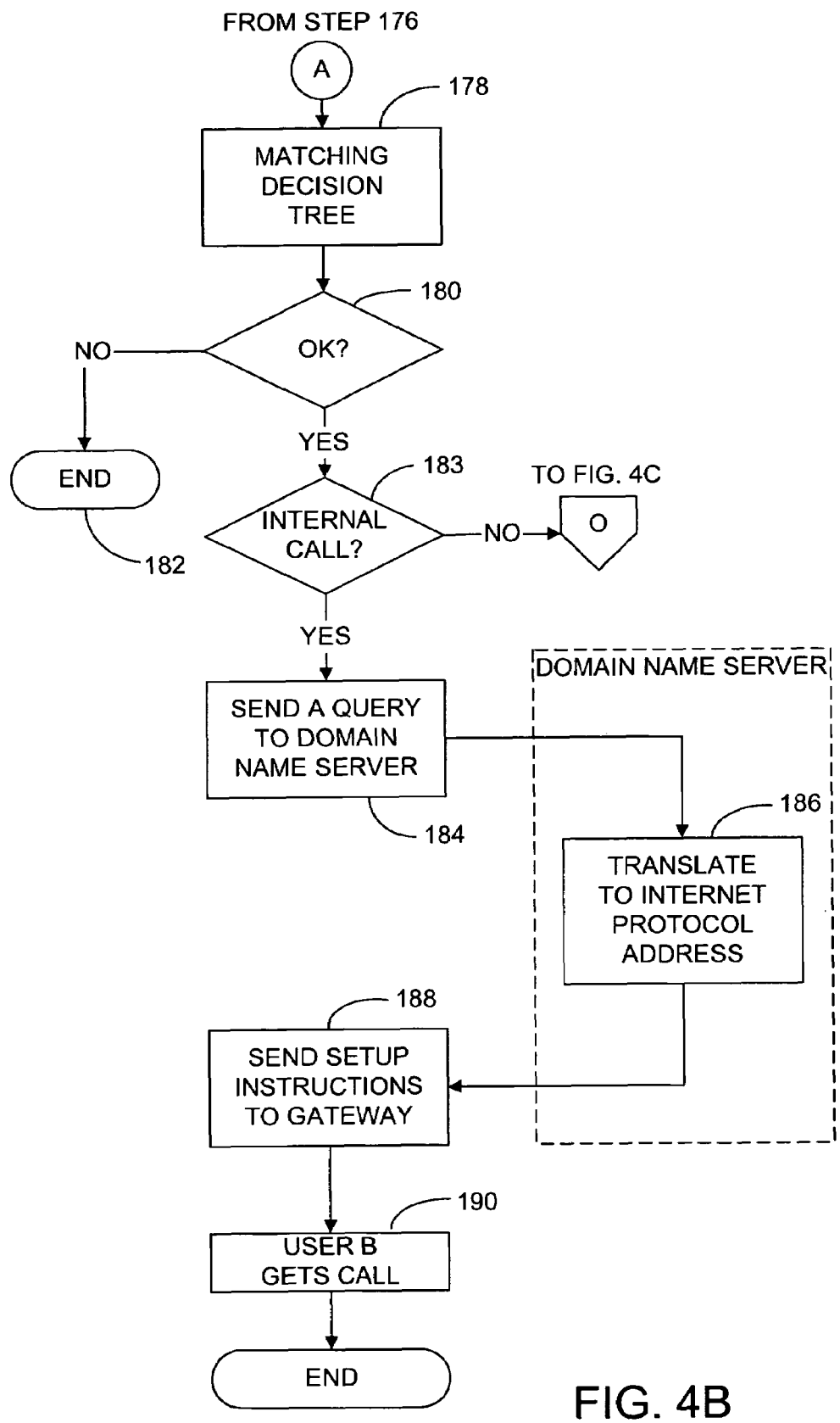

FIGS. 4A and 4B are flowcharts illustrating a method for handling intra-gateway calls in accordance with a preferred embodiment of the present invention. Per step 152, user "A" on IP gateway "X" dials 2002 to reach user "B" on the same residential gateway. The gateway passes the requests to the call agent per step 154. The call agent associated with user "A" receives a CA (2002) from the user as the dialed number and after checking the validity of the dialed digits per step 156, assigns an NA (313-555-2001) as the calling user's identity at step 160. Each call agent maintains a table cross-referencing stations or endpoints to NAs, both being relatively static physical addresses. A query is launched to the Directory Server per step 162, which performs a dual translation per steps 168, 170, converting to CA to an NA and vice versa. Thus, the dialed CA (2002) becomes an NA (313-555-2002). The user's identity, in particular, the NA assigned to the endpoint being used to make the call (313-555-2001) becomes a CA (2001). Upon receipt of the response, the originating call agent recognizes that the called party is within the gateway at step 176 and can therefore process the call internally. This is a major decision point, leading either to a process that can be completed internally or one that involves interaction with a call agent at another gateway.

Having decided to proceed internally, the call agent negotiates the "Matching Decision Tree" per step 178 which is described, in detail herein after. This decision tree matches the preferences and privileges of the two parties and arrives at a decision. This involves the granting or alternatively, denying of permission to set up a call and the return of an appropriate NA. If the call is approved for completion, per step 180, the NA should be unchanged from that supplied by the Directory Server, since this server manages the dynamics of "service portability" for roaming users. However, since the busy/idle status of the terminating station or endpoint is known only to the associated call agent, and cannot be anticipated by the Directory Server, the final result might be the NA of a voice mailbox, administrative assistant, call attendant or even an external PSTN destination such as home telephone number. In step 183, the number provided by the Matching Decision Tree, if altered from that provided by the Directory Server, is examined to ensure the destination is still internal. If it is, the call flow proceeds to step 184; otherwise the flow proceeds to step 192 in FIG. 4C.

Figure 4C:
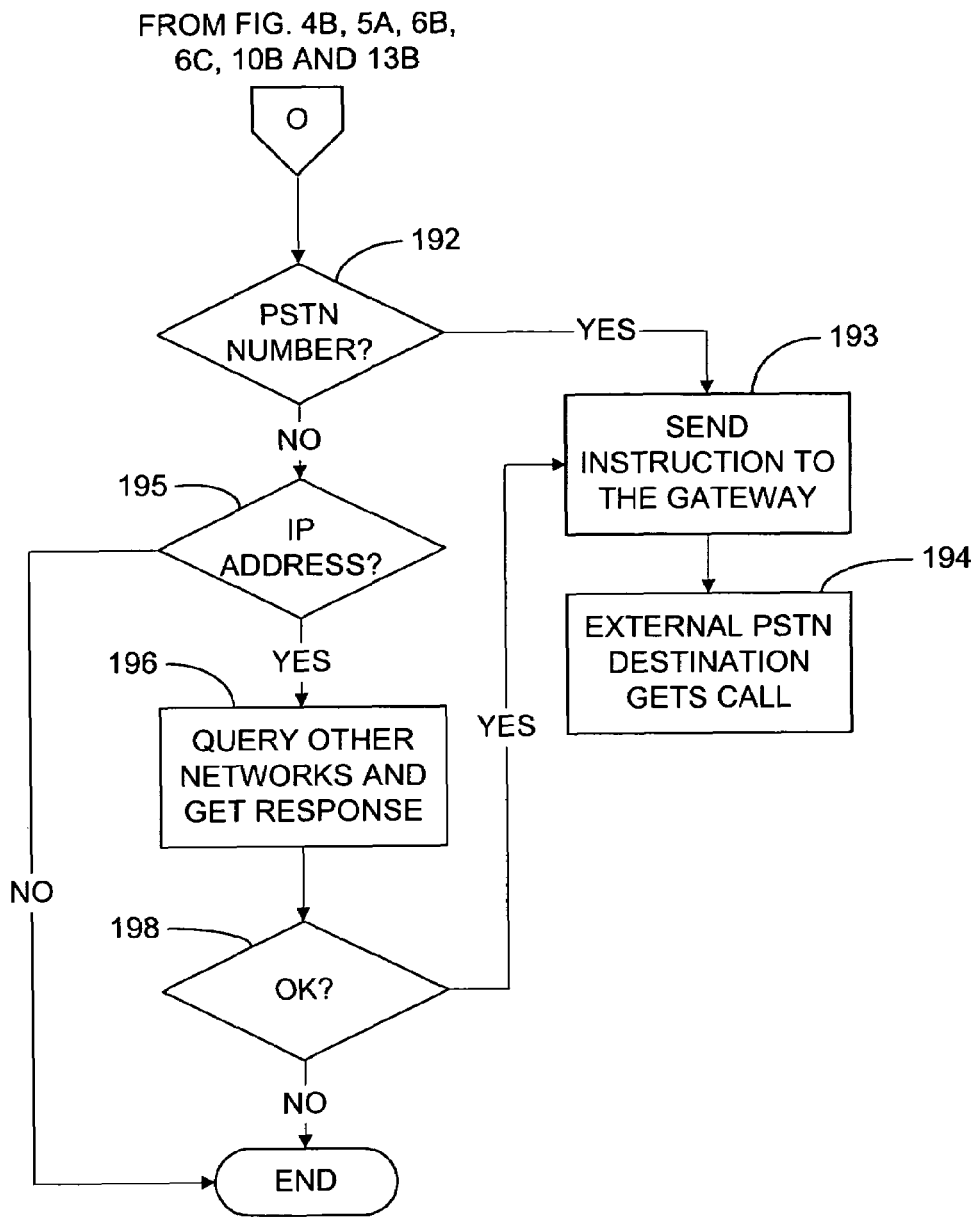

FIG. 4C describes the handling of calls where the Matching Decision Tree has identified an external destination, either in the PSTN or in another customer's VPN of the type described herein. The call flow encounters the decision 192 which differentiates a PSTN destination from an IP destination. If the destination is in the PSTN, the call agent instructs the trunk gateway to set up the call in step 194. Alternatively, if the destination is another similar VPN, the call agent launches simultaneous SIP person locator queries to the Directory Servers in one or more other networks. The queries may be, but not limited to, of the form <sip: johnsmith@othercorp.com> and the expected response is a PSTN Directory Number, or a treatment indicator. The functionality of the remote Directory Server is described herein after, in a sub section entitled "Interworking in Native Mode". Assuming the response from at least one other network is acceptable, as per step 198, and a PSTN Directory Number is returned, the call flow proceeds to step 193. Otherwise the call is given a treatment. In a particular embodiment, treatment in this case may be a voice message to the effect that the user is currently away from his desk and is not logged onto the network; please leave a message.

Once the final NA is known, the call agent in gateway "X" composes the Internet address for user "B", for example, 3135552002@bigcorp1.com. The associated Domain Name Server (DNS) uses the Internet name to generate a local Internet Protocol address that accesses the endpoint where user "B" is currently located per step 186. Set up instructions to the gateway are sent per step 188. User "B" receives a caller identity display which shows the calling number as 2001 and the calling name as "John Smith" at step 180. The calling user's name is provided by the Directory Server in step 170.

Inter-Gateway

Figure 5A:
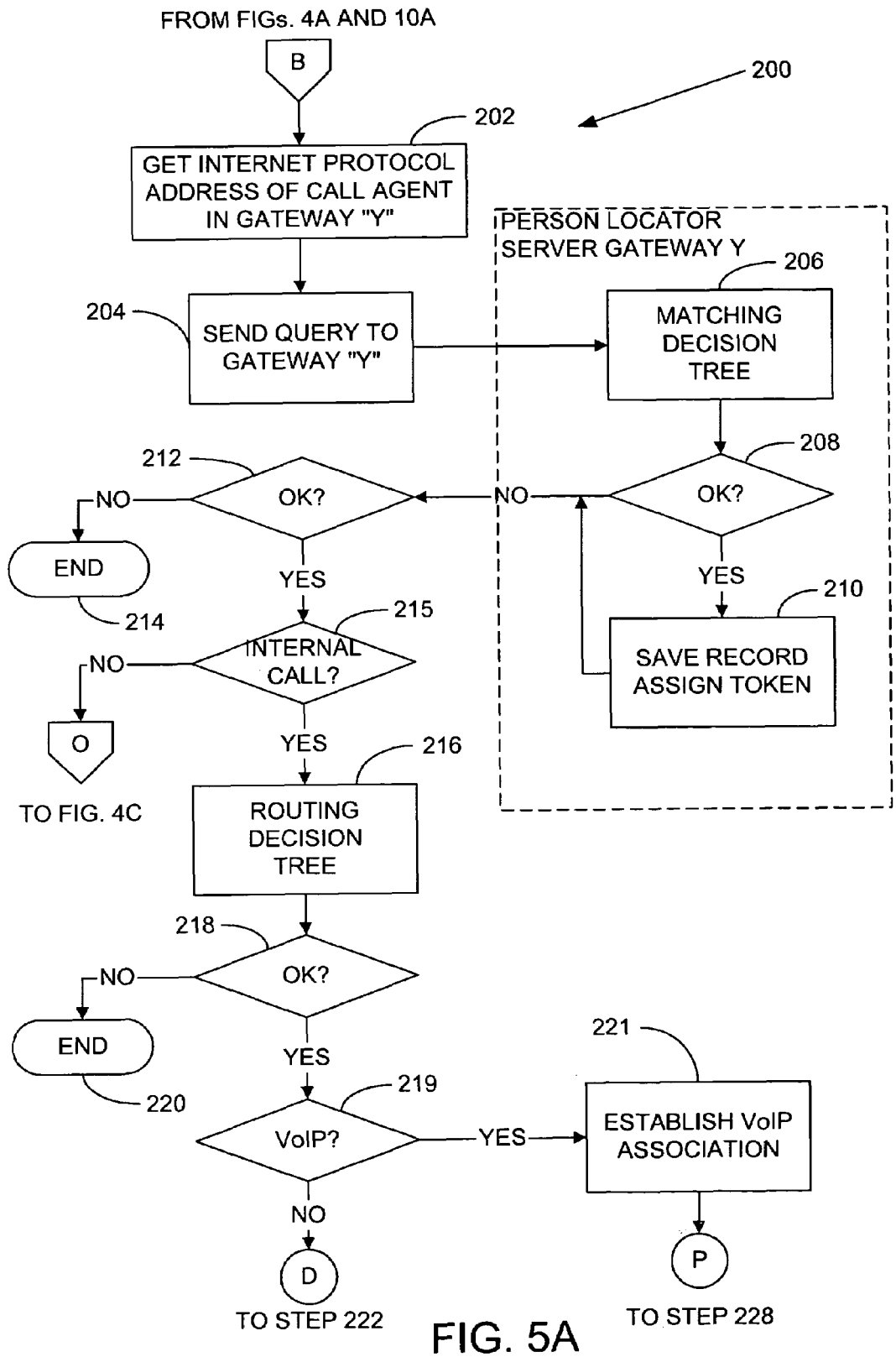
FIGS. 5A–5C are flowcharts illustrating a method for handling inter-gateway calls in accordance with a preferred embodiment of the present invention.
Figure 5B:
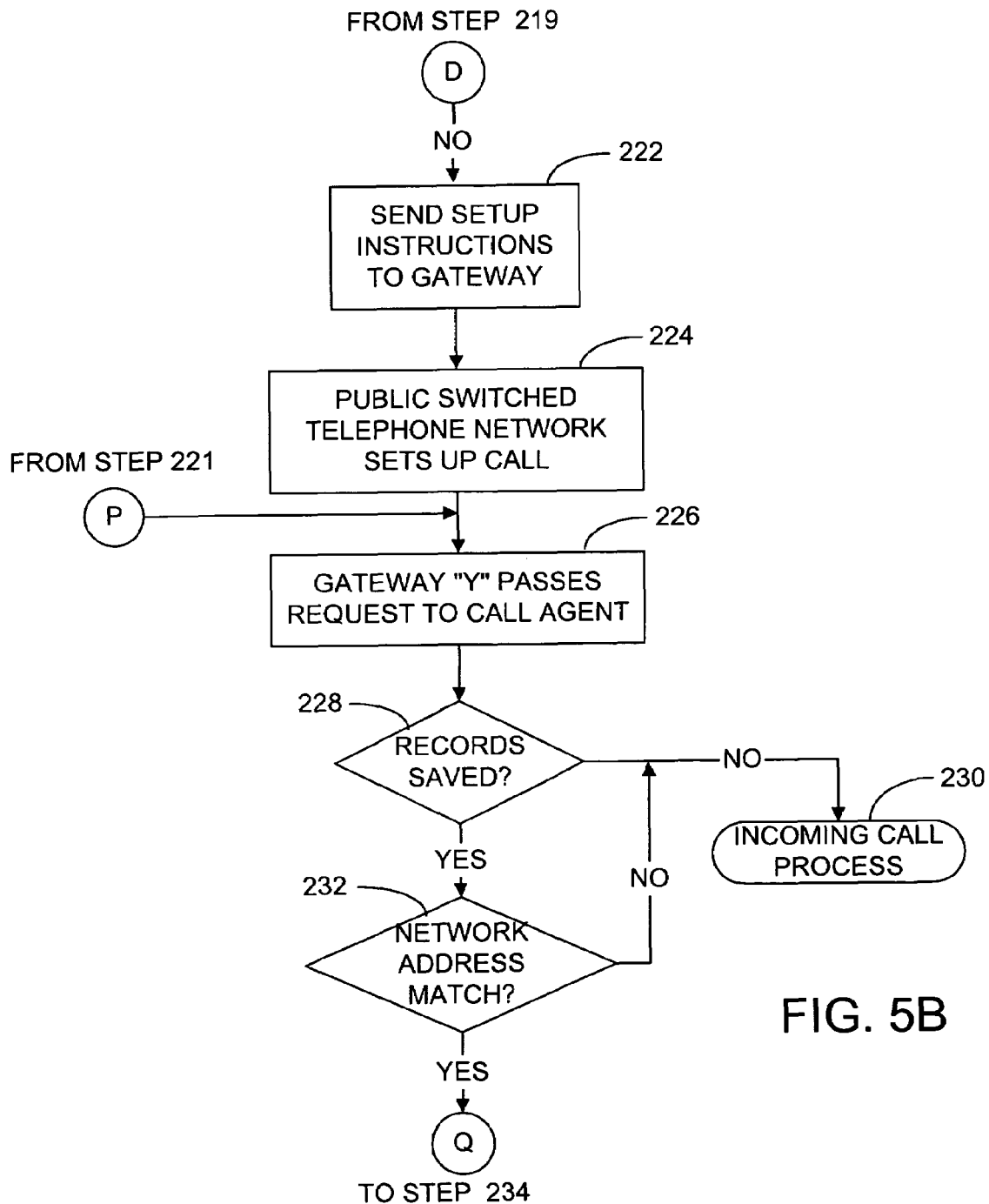
Figure 5C:
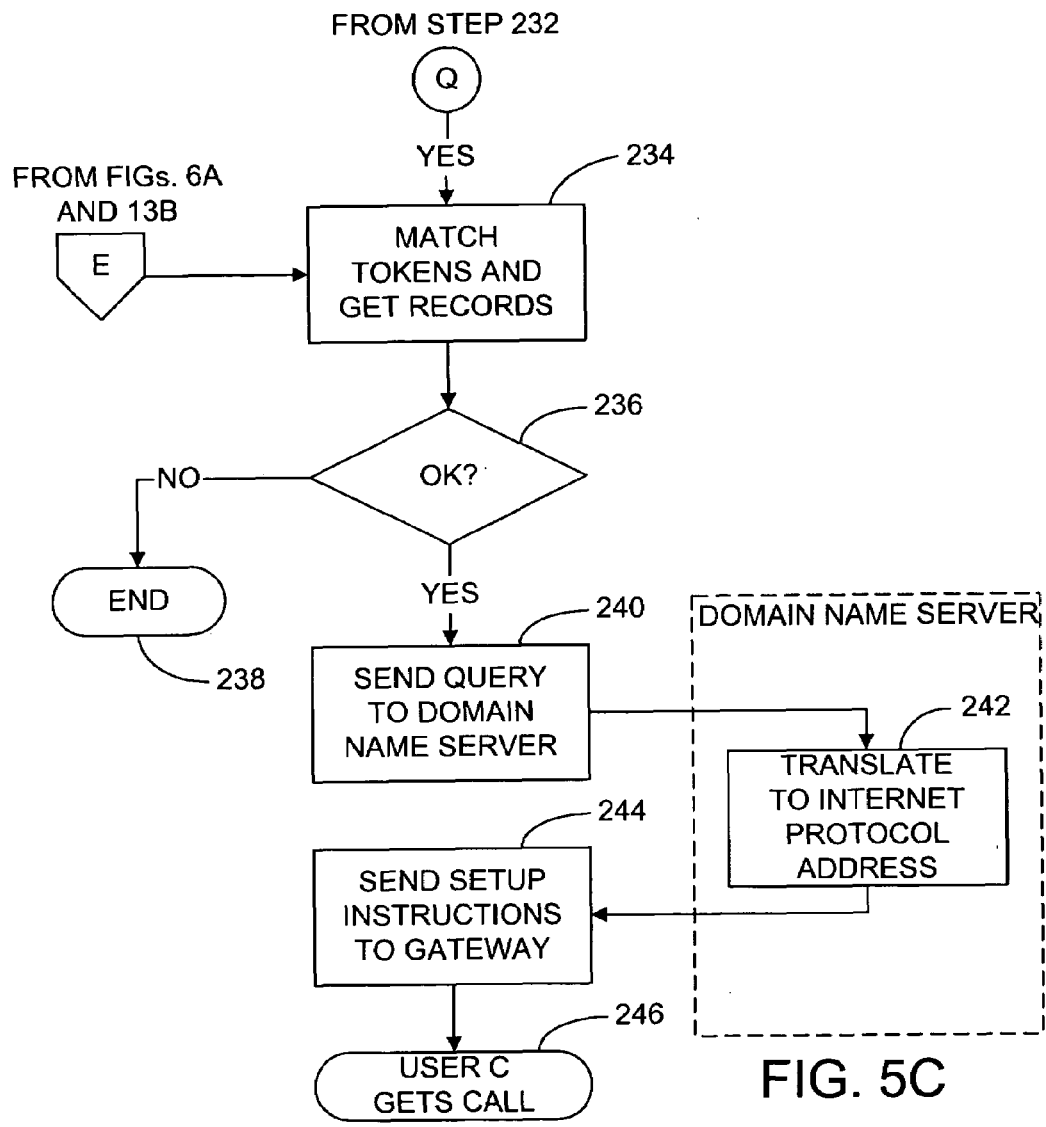

FIGS. 5A–5C are flowcharts illustrating a method for handling inter-gateway calls in accordance with a preferred embodiment of the present invention. The earlier steps of the flowcharts are the same as illustrated in FIG. 4A. User "A" on IP gateway "X" dials 3001 to reach user "C" gateway "Y". The call agent associated with user "A", also known as the originating call agent, receives a CA (3001) from the user as the dialed number and assigns an NA (313-555-2001) as the caller's identity. A query is launched to the Directory Server, which converts the CA (3001) to 709-555-3001. The caller's identity is converted from the NA (313-555-2001) to 2001. Upon receipt of the response, the originating call agent recognizes that the called party is within the private network, but at a location outside of gateway "X". This is a major decision point. In a particular embodiment, the call agent recognizes the NPA and Central Office (CO) code of the NA (i.e., 709-555) as being associated with IP gateway "Y". If CO codes are portable across local calling areas, it may be necessary to perform 10-digit analysis in order to associate an NA with a particular gateway. In such cases a Local Number Portability (LNP) database can be consulted to convert the NA to an appropriate Location Routing Number (LRN). The CO code portion of the LRN can then be used to make the determination. Accordingly, the originating call agent composes a Session Initiation Protocol (SIP) person locator query or message containing the caller's identity (CA) and the destination address (NA), as well as all relevant call data the might be required by advanced features. It sends this message to gateway "Y" per step 204. The SIP message is used to transfer user A's business unit and privilege information, multimedia service requirement specifiers, as well as any other information needed by the terminating call agent. Additionally, end-to-end features which rely on the capabilities of IP signaling take advantage of this end-to-end, pre call setup SIP conversation. For example, in the case of a multimedia call, the voice portion might be established via the PSTN while the video component is split off and conveyed end-to-end via the managed IP network. To facilitate such end-to-end associations in an environment which conserves global resources, local IP addresses are exchanged at this point. A combination of a global gateway IP address plus the local IP address within that gateway is then used to establish such associations.

The call agent at gateway "Y" notes the person locator nature of the SIP message and proceeds to function as a proxy server for the originating call agent in gateway "X". Use of local IP addresses for individual endpoints makes a SIP redirection server impractical; hence in a particular preferred embodiment the person locator server is a SIP proxy server capable of fulfilling the initial query by remaining aware of its state. This involves negotiation of the "Matching Decision Tree" per step 206. The preferences and privileges of the two parties are matched and a decision is made. As before, this involves the granting or denying of permission to set up a voice path and the return of an appropriate NA. The busy/idle status of the terminating station or endpoint is only known to the call agent in gateway "Y", and is not anticipated by the Directory Server or the originating call agent in gateway "X". The call agent at gateway "Y" concludes by returning a SIP response message containing permission for the call or lack thereof, an updated NA, if necessary, and a reference token (hereinafter referred to as "the token"). A record of the transaction, including, but not limited to, all pertinent history details such as the calling user's name, CA, and "class of service", is stored in co-located short-term memory per step 210 as a dynamic object. A timer is set against the called station to ensure against intrusion by other incoming calls until the one in progress has been completed, a typical user-settable value being in the range from approximately 15 to 60 seconds. During this interval, which should normally be no longer than 4 seconds, the called station does not receive dial tone on attempted call originations and other incoming calls receive the busy line treatment specified in the called user's profile. Should the timer expire before receipt of the call, the dynamic object representing the call in progress object is eliminated, and the access embargo on the called station is removed.

Upon receipt of a response from the call agent in gateway "Y", the originating call agent in gateway "X" prepares to set up a call per step 222. It is assumed permission for call setup has been granted; otherwise, the originating call agent would have been requested to provide the calling user with treatment, for example, a busy signal and the call attempt would have been aborted. In step 215, the number provided by gateway Y is examined to ensure the destination is still internal. If it is not, the call flow proceeds to step 192 in FIG. 4C. Assuming an internal call, the call flow proceeds to step 216. The call agent consults the "Routing Decision Tree" per step 216 which is described herein after. This decision tree can conclude in step 218 that the call is to be aborted due to lack of appropriate voice transport facilities, an end-to-end VoIP association is to be established between the gateways with or without bandwidth reservation, or that an end-to-end call through the circuit-switched PSTN is to be attempted. For the purposes of this example, it is assumed that the PSTN is to be used for voice transport per step 224.

The originating call agent directs trunk gateway "X" to set up a PSTN call to the provided NA, which is equivalent to the Directory Number (DN) of the target network termination point. This is populated into the Called Party Number parameter of the Signaling System 7 (SS7) Initial Address Message (IAM). The IAM is a message sent in the forward direction as part of the Integrated Services Digital Network (ISDN) User Part Call set up protocol. The IAM is a Mandatory Message which initiates seizure of an outgoing circuit and which transmits address and other information relating to the routing and handling of a call. The aforementioned token is populated into the characters of the Generic Name parameter of the said IAM. Finally, the NA of the calling station is populated into the Calling Party Number parameter, per standard PSTN practice. Thus a total of three SS7 IAM parameters are involved in conveying the necessary VPN call setup information between gateways. The PSTN, using traditional routing procedures, which may or may not involve functionality for Local Number Portability, routes the call to gateway "Y". Trunk gateway "Y" passes the request to the call agent per step 226 and recognizes the DN as one being managed by the same call agent that performed the aforementioned person locator proxy server function. Upon boot up, each call agent advises the residential and trunk gateways about the endpoints or network termination points which it manages. The gateways store this information for subsequent use. This functionality is described in the Media Gateway Control Protocol (MGCP). Consequently, all transactions involving a particular DN are handled by the same call agent, in particular, a mated pair of call agents. Accordingly, the terminating call agent is notified and given information about the incoming call.

The terminating call agent is anticipating a call from the indicated NA, i.e., this particular call. Upon performing the capture, the terminating call agent gets the token from the Calling Name field and uses it to retrieve the history of the call from its short-term memory per step 234, as well as to provide a secure association between the granting of permission and the actual incoming call. Since all the necessary data is now available, the call agent composes the Internet address for user "C", i.e., 7095553001@bigcorp2.com. The call is completed even if the called station is currently off-hook, in which case the step of applying alerting tone is bypassed. The associated Domain Name Server (DNS) uses the Internet name to generate a local Internet Protocol address per step 242 that accesses the endpoint where user "C" is currently located. User "C" receives a caller identity display which shows the calling number as 2001 and the calling name as "John Smith" at step 246. The calling user's name was provided by the Directory Server in gateway "X", transported through the managed network on the initial SIP message, stored in the terminating call agent's short-term memory, and subsequently retrieved on receipt of the call from the PSTN External Call Handling In a preferred embodiment, CAs cannot begin with the digits "8", "9", or "0", these being reserved for private trunk network access, escape to the PSTN, and attendant services, respectively. Thus, the Directory Server is set up to recognize these prefix digits and bypass the normal translation algorithms. For example, if the call is destined for the PSTN, neither the dialed number nor the caller's NA is translated.

Figure 6A:
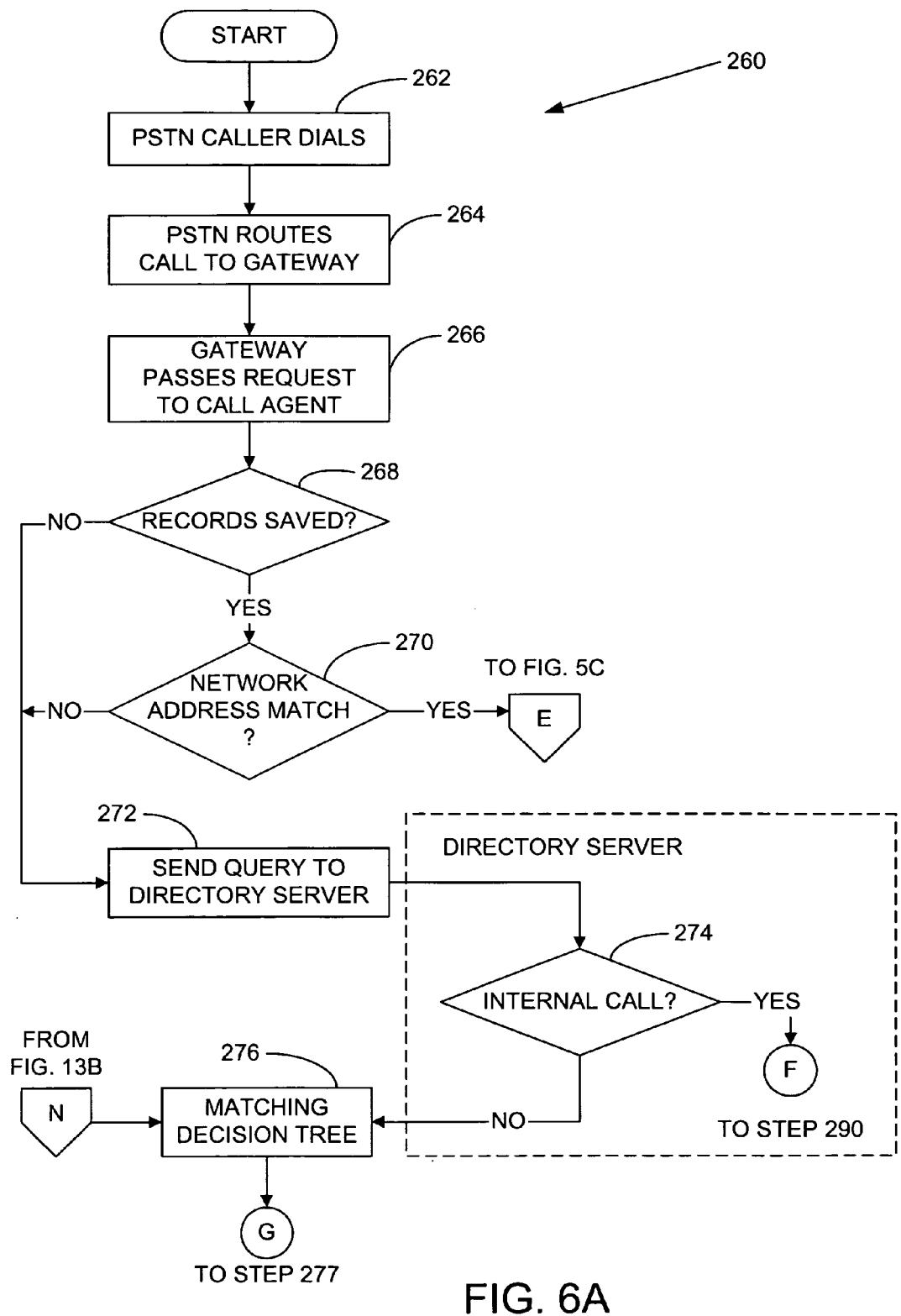
FIGS. 6A–6D are flowcharts illustrating a method for handling incoming external calls in accordance with a preferred embodiment of the present invention.
Figure 6B:
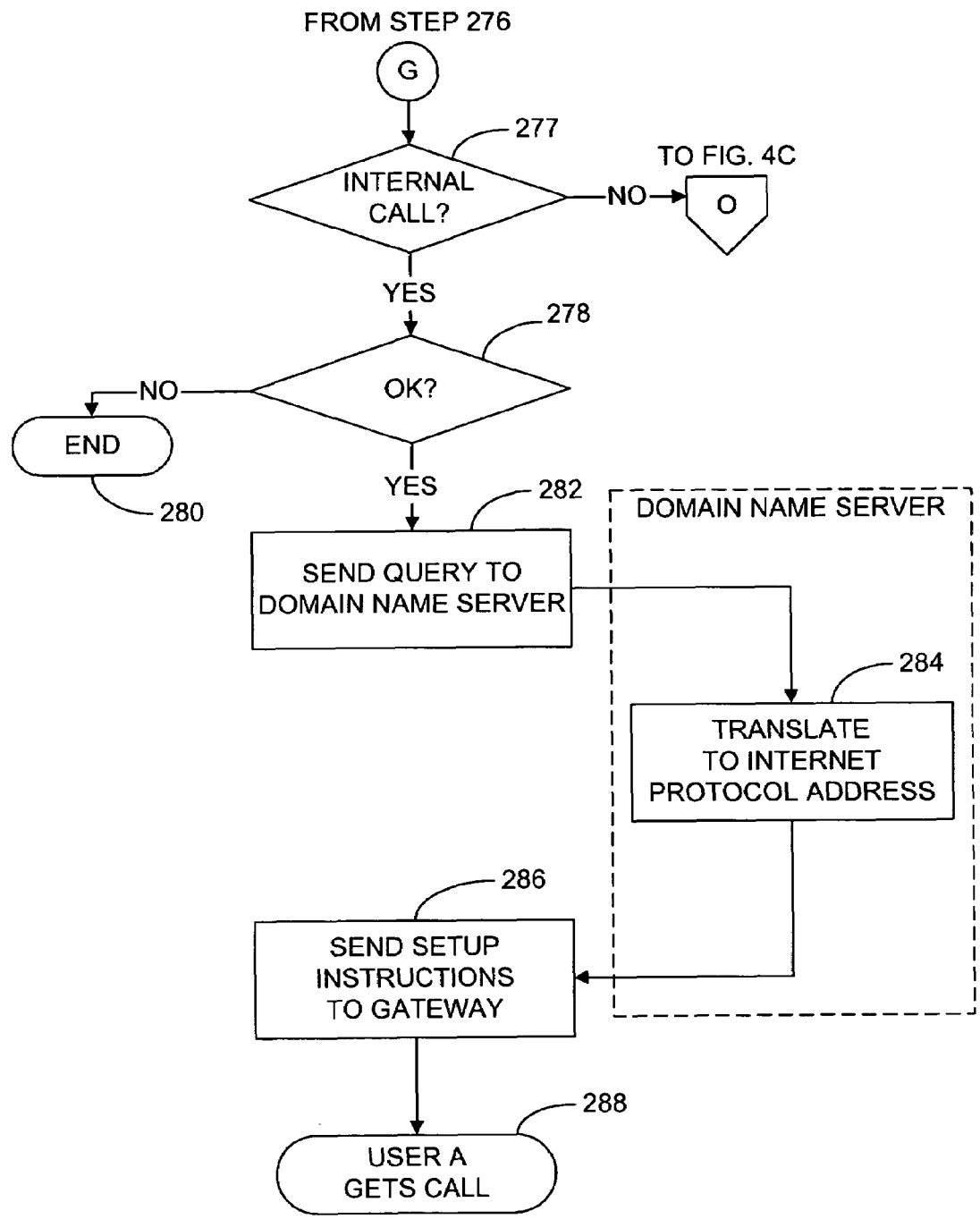
Figure 6C:
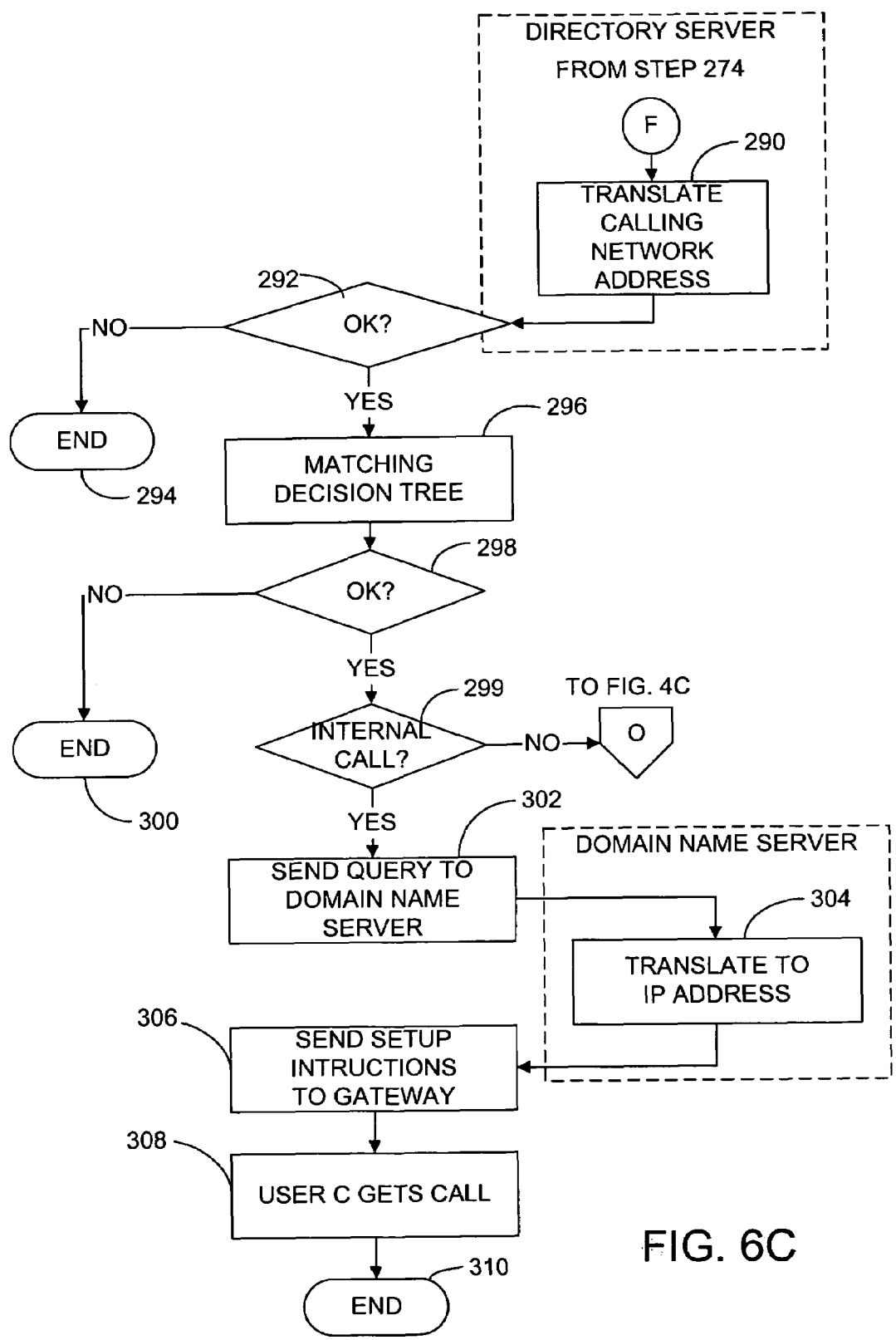
Figure 6D:
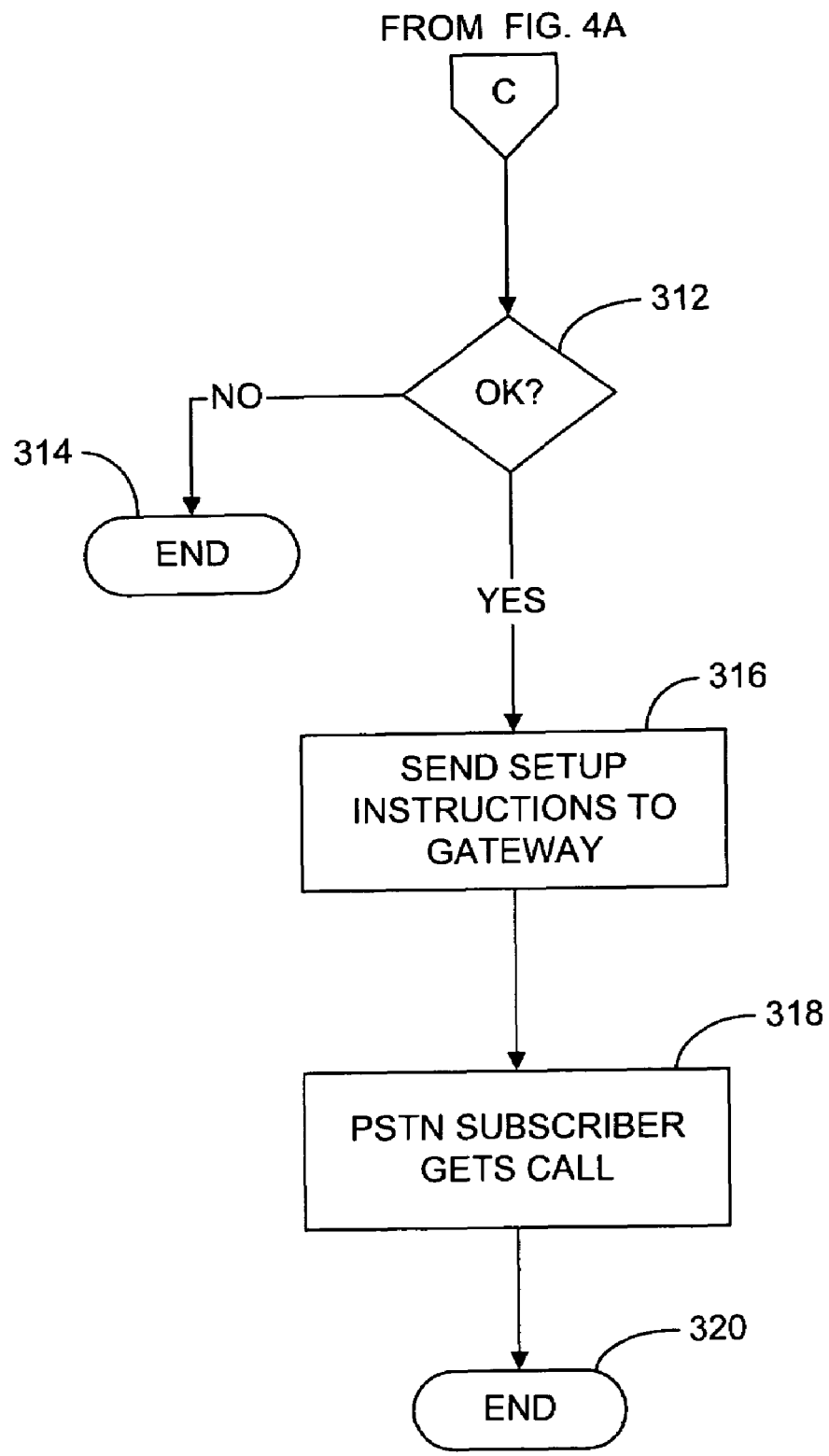

FIGS. 4A and 6D are flowcharts illustrating a method for handling outgoing external calls in accordance with a preferred embodiment of the present invention. Assuming an outgoing call to the PSTN per step 152, the aforementioned user "A" dials the PSTN number, for example, 9-313-555-7860. The call agent associated with user "A" receives the full PSTN number as the dialed digits and assigns an NA (313-555-2001) as the caller's identity per step 160. A query is launched to the Directory Server per step 162, which recognizes the escape code and declines to translate either number per step 164. Both are returned to the call agent unchanged per step 312 (from FIG. 6D), with the DS flag set to indicate that the translation function has been completed. The call agent then requests trunk gateway X to set up a call to the PSTN. Because the call is destined for the PSTN, the Generic Name parameter of the SS7 IAM contains a proper calling name and not a "token".

FIGS. 6A–6C are flowcharts illustrating a method for handling incoming external calls in accordance with a preferred embodiment of the present invention. For an incoming call from the PSTN, the PSTN user at 313-555-7860 calls user "A" in the private network by dialing 313-555-2001 at step 262. The PSTN routes this call via conventional means to gateway "X" at step 264. If the call agent has call-in-progress records saved, and is awaiting internal inter-gateway network calls to complete step 268, the incoming NA is tested against these records for a match per step 270. Because the call originated in the PSTN, no match is found. If a match is found, this identifies the terminating leg of an inter-gateway Virtual Private Networking call per step 234 of FIG. 5B. The call agent assigned to the Directory Number launches a query to the Directory Server with the received digits and the caller's identity in step 272. The Directory Server recognizes this as a call from the PSTN and declines to translate either number at step 274. Both the dialed number and the caller's ID are returned to the call agent unchanged in step 276, with the DS flag set. The Matching Decision Tree 276 is optimized to process calls that originate and terminate within the customer's network, and is therefore keyed to recognized CAs. Because this call is coming from the PSTN, the caller cannot be identified, only the calling PSTN station. Therefore, the matching process sequence is required to recognize the external call, or a call directed to the Portability Server, described herein after, via a NA_Not_Translated (NNT) flag set by the call agent, and substitute the caller's Directory Number in place of the anticipated incoming CA. In step 277, the number provided by the Matching Decision Tree is examined to ensure the destination is still internal, since it is possible for a user to forward an external incoming call to another external destination. If it is still internal, the call flow proceeds to step 278; otherwise the flow proceeds to step 192 in FIG. 4C. Assuming the called NA has an assigned CA, the call agent composes an Internet name, i.e., 3135552001@bigcorp1.com. The associated DNS then uses this name to establish an association with the physical endpoint where user "A" is currently located at step 284. The situation where user "A" has roamed to another location is described herein after in the section regarding "service portability." In a particular embodiment, had the target NA not had an assigned CA, or had there been no such NA, the caller would have been given "no such number" treatment.

It is possible for a user to call another internal user by dialing the escape code plus the called user's full ten-digit Directory Number. This may be a strategy a user employs to circumvent routing restrictions during network overload or failure conditions. For this reason and also to facilitate the network survivability aspect described herein after, when presented with an outgoing call, the Directory Server is required to confirm that the destination is external to the private network. It does this by searching through the NAs for a match with the dialed DN. If a match is found, the customer has the option of providing the caller with a treatment and a voice message. If the call is allowed to proceed, the call agent must be advised to insert a null token into the Generic Name parameter of the SS7 IAM. On incoming calls, the Directory Server is also required to confirm that the caller is external to the private network. It does this by searching through the NAs for a match with the caller's ID. If there is no match, the call agent is advised to pass the calling name field to the called party unchanged. If the caller is internal to the private network, i.e., an internal call has been completed via the PSTN, the call agent expects a valid token in the name field. A token value of zero causes the call agent to implement the default routing feature. Described herein after, and illustrated in FIG. 6C, the default routing feature is used by a terminating call agent in the VPN to reconstruct the calling user's profile and to re-negotiate the Matching Decision Tree during a network failure condition.

Matching Decision Tree

The Matching Decision Tree is invoked when the decision whether or not to set up a call, or the final destination of a call, is not obvious. Otherwise, an immediate exit of this process sequence occurs and the call is established to the NA already provided by the Directory Server. Ambiguity is introduced when the called user is on the phone, i.e., busy, has invoked a version of the call forwarding features, or has activated a restricting feature such as "do not disturb". In such a preferred embodiment, the call flow complexity is increased. This increase is complexity is addressed by the Matching Decision Tree. User identities are normalized to be CAs. Thus, if a caller enters a user name instead of a CA to reach a desired user, the name is translated to a CA in the Directory Server before being presented to the Matching Decision Tree. As state herein before, the logic in the Matching Decision Tree depends on CAs. When users enter data into their profiles for the Matching Decision Tree, such as specific users in Selective Call Forwarding, they may enter either a CA, a PSTN Directory Number (DN) for outside calls, or an internal user name. If a user name is entered instead of a CA, the administrative function that builds the user's profile consults the Directory Server for a translation of the name into a CA. Thus, in a particular embodiment, it is either a CA or a PSTN DN, as appropriate, that identifies the caller in the Matching Decision Tree.

The Matching Decision Tree is the organization of the call flow for a particular application, expressed in a tree-like structure. A generic logic tree is a template consisting of decision points where variable data are evaluated against fixed criteria and decision taken. In a particular embodiment, the criteria are supplied to the call agent by the Directory Server, either periodically as dictated by changes, or in response to a direct query. The criteria for the matching function come from pre-programmed data obtained via the terminating user's profile. Because the logic tree is a generic template, and can be filled in by the Directory Server, the terminating user can roam throughout the network while retaining full terminating CMS feature functionality. The variable data includes the caller's CA and class of service. The class of service consists of two parts: 1) a code which identifies the work group within the organization, for example, but not limited to, business unit, section, district, and department; and 2) a value which identifies the caller's privileges and status within the work group. The data also includes per-call transient state information known only to the call agent, for example, busy/idle status of the terminating endpoint or network termination point, Call Forward All (CFA) invoked, Do Not Disturb invoked, or Selective Call Acceptance features activated.

The functionality described herein above bears some similarity to the Service Creation Environment envisaged for the PSTN's Advanced Intelligent Network (AIN). In a method in accordance with a preferred embodiment, the call agent plays the role of the Services Control Point (SCP) while the Directory Server plays the role of the Services Management System (SMS). The analogous SCPs are those provided by IntereXchange Carriers (IXCs) to deliver value-added 800 features to their customers. In a preferred embodiment, having an AIN version of the SCP, the full ten digits of an 800 number direct the call flow to a file containing a Flexible Service Logic (FSL) tree that describes the features, their datafill, and their method of interworking, for a specific 800 customer. FSL is the concept of supplementing application program logic through the use of non-executable code, i.e., data. Typical FSL features include time-of-day routing, day-of-week routing, overflow on busy routing, and location finder based on the caller's number. The SMS is an operations support system used to facilitate the provisioning and administration of service data required by the SCP. In an idealized version, an IXC employee user a Graphical User Interface (GUI) on the SMS to assemble a customer's logic tree using icons from a pallet that represents the features. The SMS downloads the finished FSL tree to the SCP where it is used to direct real time call flow. In the functionality described herein, the customer's network administrator creates the user's logic tree, which then resides in the user profile in the Directory Server. The Directory Server downloads the FSL tree to the call agent. In FSL, the logic the data represents is stored in a decision graph. However, the flexibility can be greatly constrained with acceptable results, in particular, the features can be placed in a rigid hierarchy. Some features can be placed at the top of the tree whereas others can be placed at the bottom. For example, a feature which determines an outcome based on the caller's identity or privilege is best placed at the top of the tree. Features such as time-of-day routing or Call Forwarding All (CFA are best placed near the bottom because some of the options they provide may only be available to privileged or anticipated callers.

Figure 7A:
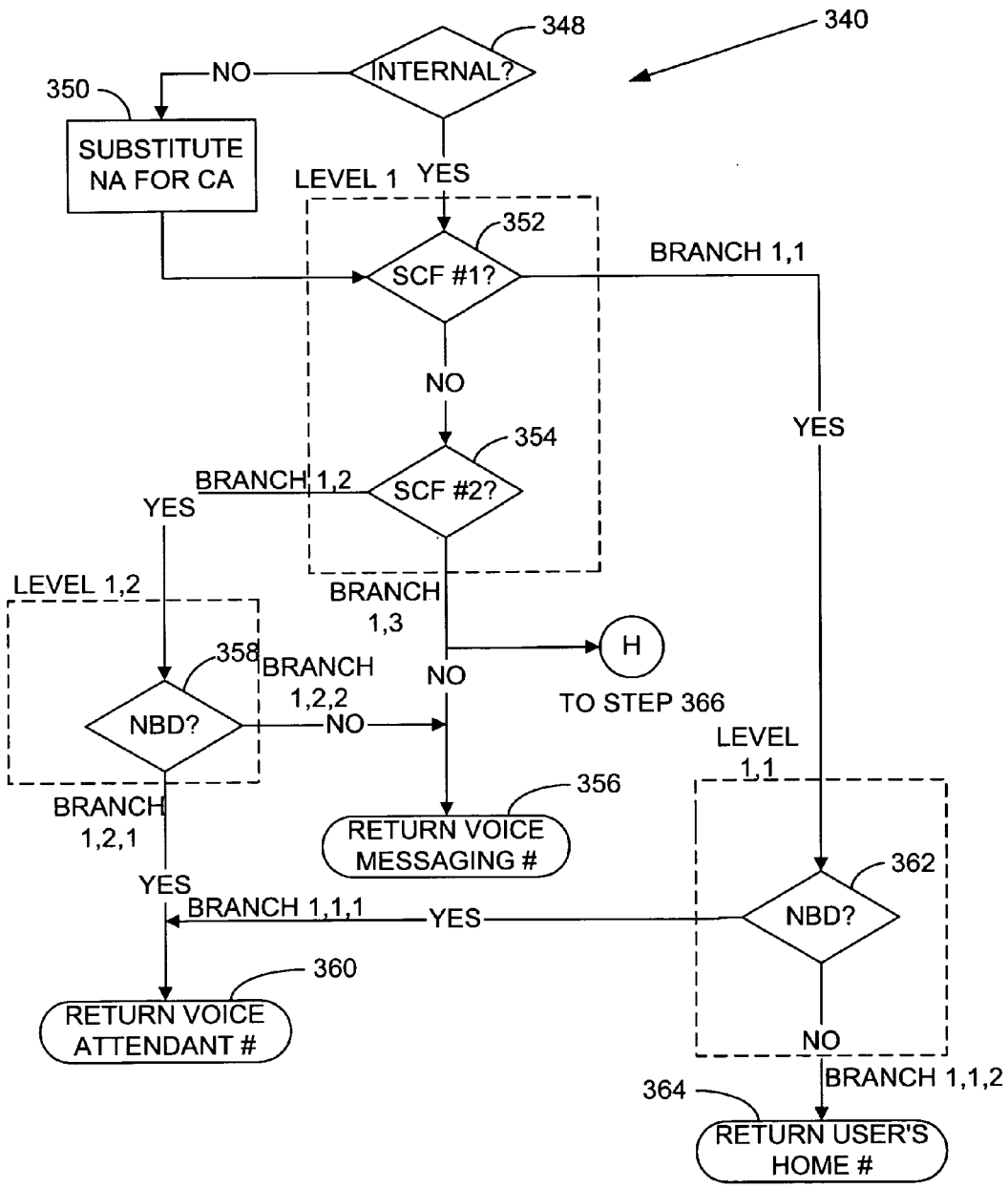
FIGS. 7A and 7B are flowcharts illustrating a method for a matching decision in accordance with a preferred embodiment of the present invention.
Figure 7B:
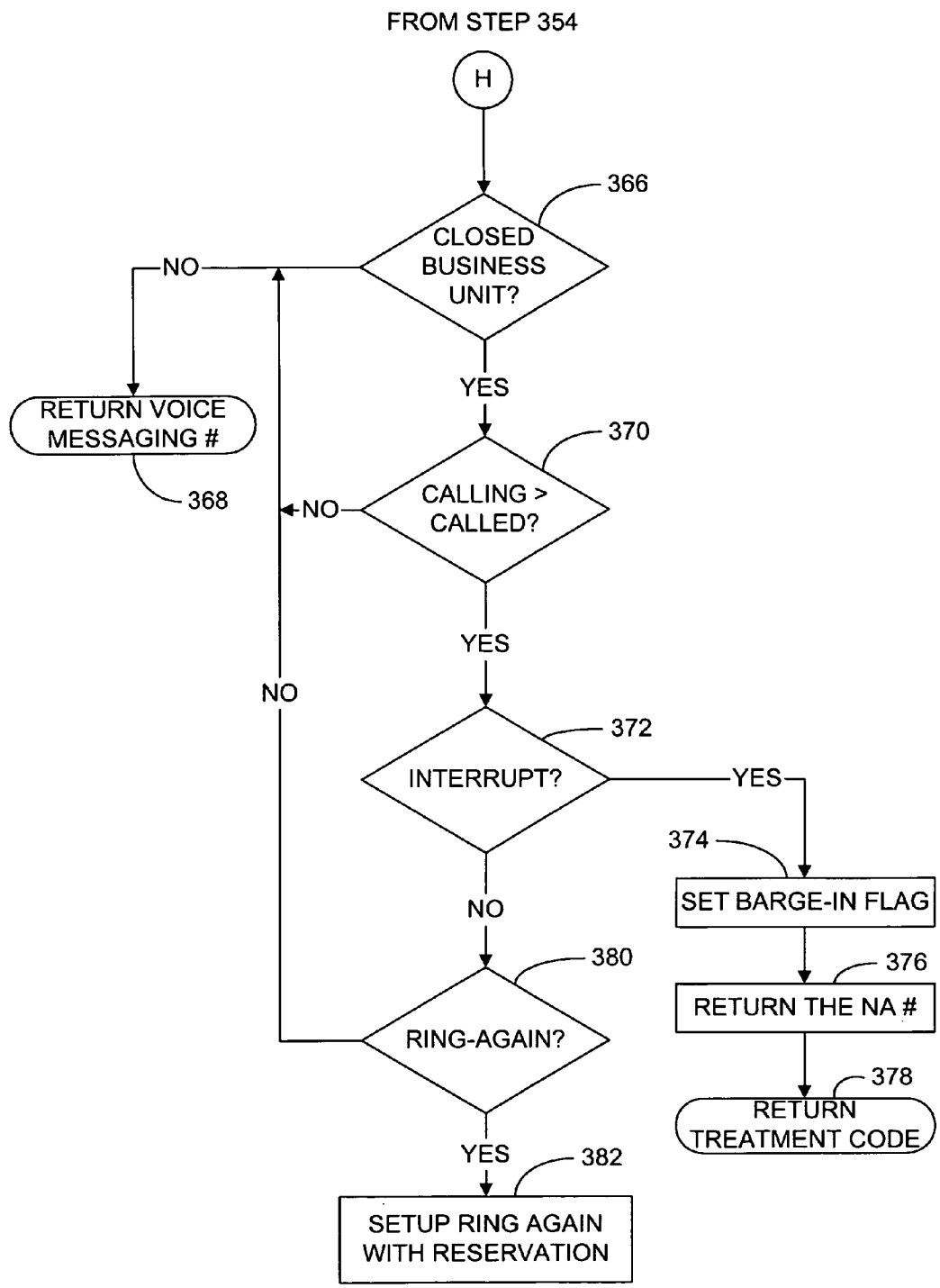

FIGS. 7A and 7B are flowcharts illustrating a method for a Matching Decision Tree. In particular, they describe a redirection example, in accordance with a preferred embodiment of the present invention. It should be noted that users are identified by their CAs, rather than by their NAs. This allows calling and called users to roam amongst a multiplicity of NAs while preserving the validity of the matching logic tree's decision. As identified herein before, because calls from the PSTN do not have CAs, it is necessary to identify such calls and substitute the caller's Directory Number for the expected CA. The system administrator has assigned the business unit a simple two-level hierarchy. The top level is Selective Call Forwarding (SCF) on "busy/no answer" of the terminating network station or endpoint. The second level, which is the bottom level in this example, is time-of-day routing. This hierarchy is captured in a business unit profile "XYZ". The user, who is a member of the "XYZ" group, decides to enable SCF and supplies two numbers in the user profile to be given the treatment, each of which represents a branch in the tree from this decision point. A third branch represents "else", or all other numbers. All three branches encounter the second level in the hierarchy, namely time-of-day routing. The user decides to enable time-of-day (TOD) routing on the first two branches only. For the sake of simplicity, time of day routing has two output legs or segments, normal business hours, and "else". Each branch of the tree ultimately terminates on either a choice of treatment or an alternative NA.

In a particular embodiment, there are five branches in total. The following table, Table 1 shows one possible format for a message from the Directory Server to the call agent, intended to fill a logic tree template with the data required to illustrate the example:

TABLE 1

| MESSAGE | DESCRIPTION |
| --- | --- |
| true | the SCF feature node |
| 3 | branches to follow |
| 1, 1 | branch identity |
| 2001 | data for the branch (a CA) |
| true | the TOD feature node |
| 2 | branches to follow |
| 1, 1, 1 | branch identity |
| start time & end time | data for the branch (normal business day) |
| stop & attendant | termination of branch and treatment (an NA) |
| 1, 1, 2 | branch identity |
| "else" | data for the branch (default) |
| stop & home phone | termination of branch and treatment (a directory number) |
| 1, 2 | branch identity |
| 2002 | data for the branch |
| true | the TOD feature node |
| 2 | branches to follow |
| 1, 2, 1 | branch identity |
| start time & end time | data for the branch (normal business day) |
| stop & attendant | termination of branch and treatment (an NA) |
| 1, 2, 2 | branch identity |
| "else" | data for the branch (default) |
| stop & voice message | termination of branch and treatment (an NA) |
| 1, 3 | branch identity |
| "else" | data for the branch (default) |
| false | the TOD feature node |
| 1 | branches to follow |
| 1, 3, 1 | branch identity |
| stop & voice message | termination of branch and treatment (an NA) |
| / | end of file |

The ability to place both parties in the same business unit, "XYZ" in this case, provides compartmentalized closed user sub-groups within the customer's network. This allows the behavior of the CMS features to be tailored to the requirements of individual business unit managers. For example, user names on internal calls can be "Paul", "Sue", or "Bill". Calls between business units can be augmented with a business name as well as the user name. Calls to the PSTN can use the corporate name. In another example, the business unit manager can exercise intrusive features such as "barge-in" or interrupt when calling subordinates.

Any number of branches in the Matching Decision Tree can identify destinations that are external to the customer's VPN, being either in the PSTN or in the similar VPNs of other customers. In the latter case, the user may enter a plurality of domain names as potential destinations and all are queried simultaneously. Given the ambiguity in potential destination types, the Matching Decision Tree sets a flag in the return message indicating internal, external, or external IP.

In order to illustrate the call flow in FIGS. 7A and 7B, it is assumed that Selective Call Forwarding (SCF) #1 contains the CA 2001, representing User "A". The called user is User "B". Calls are made during the normal business day (NBD). User "B" is in the office but is on the phone.

User A initiates the call flow depicted in FIGS. 4A and 4B. At step 178 the call flow enters the more detailed flow chart as depicted in FIG. 7A. At step 352, User "A" is recognized by the 2001 CA and the call flow is directed to step 362. Because it is during the normal business day, the call is directed to step 360 which returns the NA of an attendant. At step 184, in FIG. 4B, the call agent notes that the NA received from the Matching Decision Tree is different from the one received from the Directory Server. It uses the updated NA to establish the call. The call is received by a voice attendant who, for example, can advise User "B" of receipt of an important call.

User "n" initiates a call to User "B". Upon reaching the Matching Decision Tree, this call proceeds through steps 352 and 354 and emerges at "H" in FIG. 7B. This is because its CA was not found in the selective call forwarding data, resulting in execution of the "else" legs. Because User "n" is not in the same business unit as User "B", call flow is directed by step 366 to step 368 which returns the NA of the voice messaging system.

User "B" is called by the department manager. The call proceeds as described above to step 366. At step 366, the calling and called user are determined to be in the same business unit, causing call flow to proceed to step 370. At step 370 it is determined by a comparison of user privileges that the caller is allowed to invoke special procedures to reach this user, causing the flow to proceed to step 372. Step 372 may either be pre-programmed to interrupt User "B's" call or to signal the caller for further instruction, as business unit data. If an interrupt is appropriate, the NA provided by the Directory Server is left unchanged, a flag denoting this interrupt decision is set in the call-in-progress record, and when User "B" gets the call, interrupt is invoked. If interrupt is declined, step 376 might be programmed to allow ring-again with reservation to be activated. Ring-again with reservation causes the called station to notify the calling station via an IP message when User "B" is off the phone. The reservation feature freezes the state of User "B's" station for a pre-determined interval, for example, 60 seconds—30 seconds to alert the caller, 15 seconds to establish a worst case PSTN connection, and 15 seconds for margin, until the department manager has had a chance to establish the call. Ring-again with reservation is set up in step 378 and an appropriate treatment code is returned to the originating call agent.

Routing Decision Tree

Figure 8:
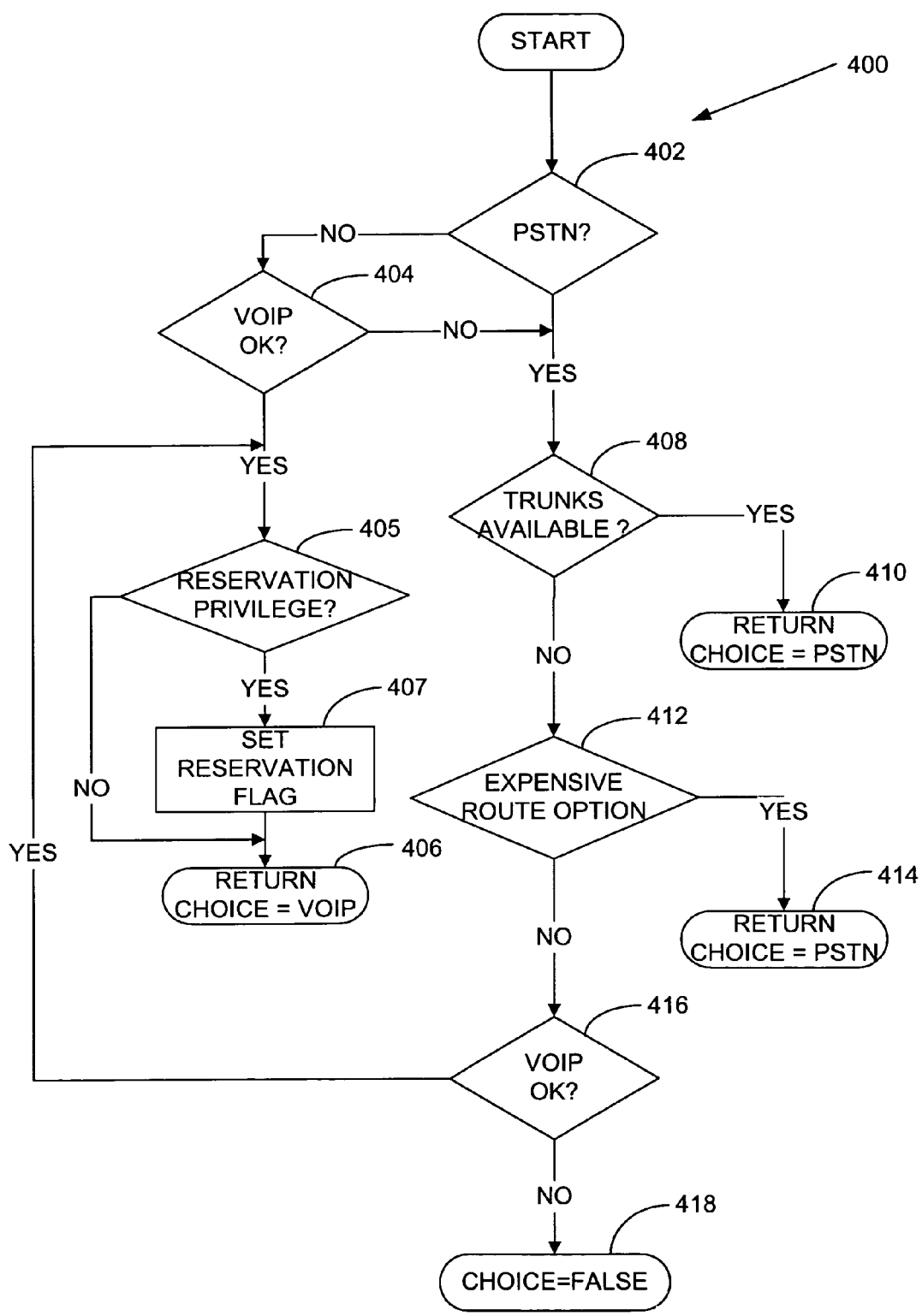
FIG. 8 is a flowchart illustrating a method for a routing decision in accordance with a preferred embodiment of the present invention.

FIG. 8 is a flowchart illustrating a method for a routing decision in accordance with a preferred embodiment of the present invention. The Routing Decision Tree follows the example of the Matching Decision Tree described herein before. The criteria are supplied to the originating call agent by the Directory Server, either periodically as dictated by changes, or in response to the original address translation query. The criteria for the routing function comes from pre-programmed data obtained via the originating user's profile. Because the logic tree is a generic template, and can be filled in by the Directory Server, the originating user can roam throughout the network while retaining full originating CMS feature functionality. The variable data includes the NA returned by the terminating call agent in the distant gateway, performance data from both the PSTN and the managed IP network, as well as—in a multimedia environment—the type of call the calling user wishes to make. The latter is transient data, known only to the call agent.

In the preferred embodiment, the performance of the lowest priority IP service on the managed network is continuously monitored. This is non call-related data service and there must be an amount of such traffic sufficient to provide a good buffer. When service degrades below a certain level, users with sufficient privileges are offered the option of completing calls, or the voice component of multimedia hybrid calls, via the PSTN. Users with the highest privilege level may be offered the PSTN as the first choice at step 402 with a fall back to VoIP at step 404.

The method 400 regarding the Routing Decision Tree begins with the determination if the PSTN is the preferred option for this user, and in the case of calls involving advanced features, if the requested type of call can be supported over the PSTN, at step 402. If not, then it is determined if VoIP is an acceptable option per step 404. If yes, VoIP is returned as the choice for routing. If PSTN is the selected option for the particular user then it is determined if there are any trunks available at step 408. A trunk is a communication circuit switched channel, either real or virtual between two switching systems. If trunks are available, then per step 410, PSTN is returned as the choice. If however, no trunks are available, then it is determined from the calling user's profile if an expensive route privilege is available to the user per step 412. If yes, then the user is given a warning tone and then allowed to proceed after a brief delay for reconsideration. If not, then it is determined per step 416, if VoIP is an acceptable option. If not, then an abort is returned resulting in the call being given treatment.

If it is determined at step 404 or 416 that VoIP is to be used to establish the call between gateways, in a preferred embodiment of the present invention the caller's privileges are evaluated to determine if SIP bandwidth reservation is to be employed. Bandwidth reservation guarantees the Quality of Service (QoS) at the expense of the number of calls that can be carried in a given transport facility. Thus, its use is a privilege. There is also a possibility that sufficient bandwidth might not be available. If not, the Routing Decision Tree returns a treatment code. Alternatively, the caller might be given a special tone indicating failure to reserve the required bandwidth, allowing the caller the option of either continuing with a reduced QoS or hanging up and trying again. Because the person locator functionality does not ring the called telephone, the preferred embodiment allows the reservation step to cancel the call without causing the unacceptable QoS situation of ringing followed by a busy reorder, or no trunks available signal.

In the case of a multimedia call, when insufficient IP bandwidth is available to support all user specified media, a determination needs to be made if the lifeline voice path should be established. In the preferred embodiment, the user is given either a special tone, or a voice message with words to the effect: "There is insufficient bandwidth for the video portions of this call; please try again later, or stay on the line to continue with a voice only call." After a delay of a customer settable number of seconds, call flow is returned to step 402 of the Routing Decision Tree for a voice only call. If the logic tree is successfully negotiated, the originating call agent sends an IP message to the terminating gateway revising the aforementioned service specifier for the call in progress.

It has been customary for large private networks to lease fixed numbers of virtual PSTN trunks in key cross sections. When this level has been exceeded, per-call charges apply for excessive usage. The gateway must keep track of simultaneous calls in progress for tracking against the contracted allotment of virtual trunks. When the latter number is at risk of being exceeded, the routing strategy becomes more complex. This might involve maximizing utilization of both the PSTN allotment and the full capacity of the managed IP network, followed either by given the calling user treatment or an "expensive route warning tone". In the latter instance, the user can terminate the call by hanging up and try the call again; otherwise, the call proceeds to be routed with excessive usage charges.

Address Translation Decision Tree

The user profile impacts matching and routing decisions, as discussed herein before. Because the logic trees for these functions have to consider transient data, these decisions in a preferred embodiment are best handled at the level of the call agent. However, there is a group of CMS features that affect the translation decision but are not dependent on per-call transient data; in a preferred embodiment, these are best handled by the Directory Server, without delegation.

In a preferred embodiment, screening tables are an example of CMS features that affect the translation, such as those used to deny long distance or overseas calls from certain users. In this case, the NA of a network termination point located in a public place can be assigned a CA belonging to the sub-class of user profiles used for public phones. Such a sub-class can be set up with extremely limited privileges as well as screening table entries to restrict where the user can call. Such screening can also be done through an entry in the profiles of selected users, or through a blanket setting based on the business unit identity and a user's privilege code.

The personalize "speed-calling" list is another example of a Directory Server based CMS feature. In a preferred embodiment, the business unit profile allows users to have up to eight, for example, speed-call numbers. Users enter these numbers themselves and they are retained in the user's profile, located in the Directory Server.

As described herein before, the Directory Server performs a dual translation on all internal calls. It translates the dialed CA to an NA, and the NA of the endpoint to a CA. In a preferred embodiment, the NA to CA translation is performed first. The CA locates the calling user's profile and makes screening tables and speed-call lists available to the translation process on the dialed number. If the dialed number is a speed-call number, the entry in the speed-call list is substituted and this becomes the new dialed number. If there are screening numbers present, these are compared for a match with the new dialed number. If a match occurs, the call attempt is given appropriate treatment. Otherwise, the new dialed number is routed as described herein before.

Figure 9:
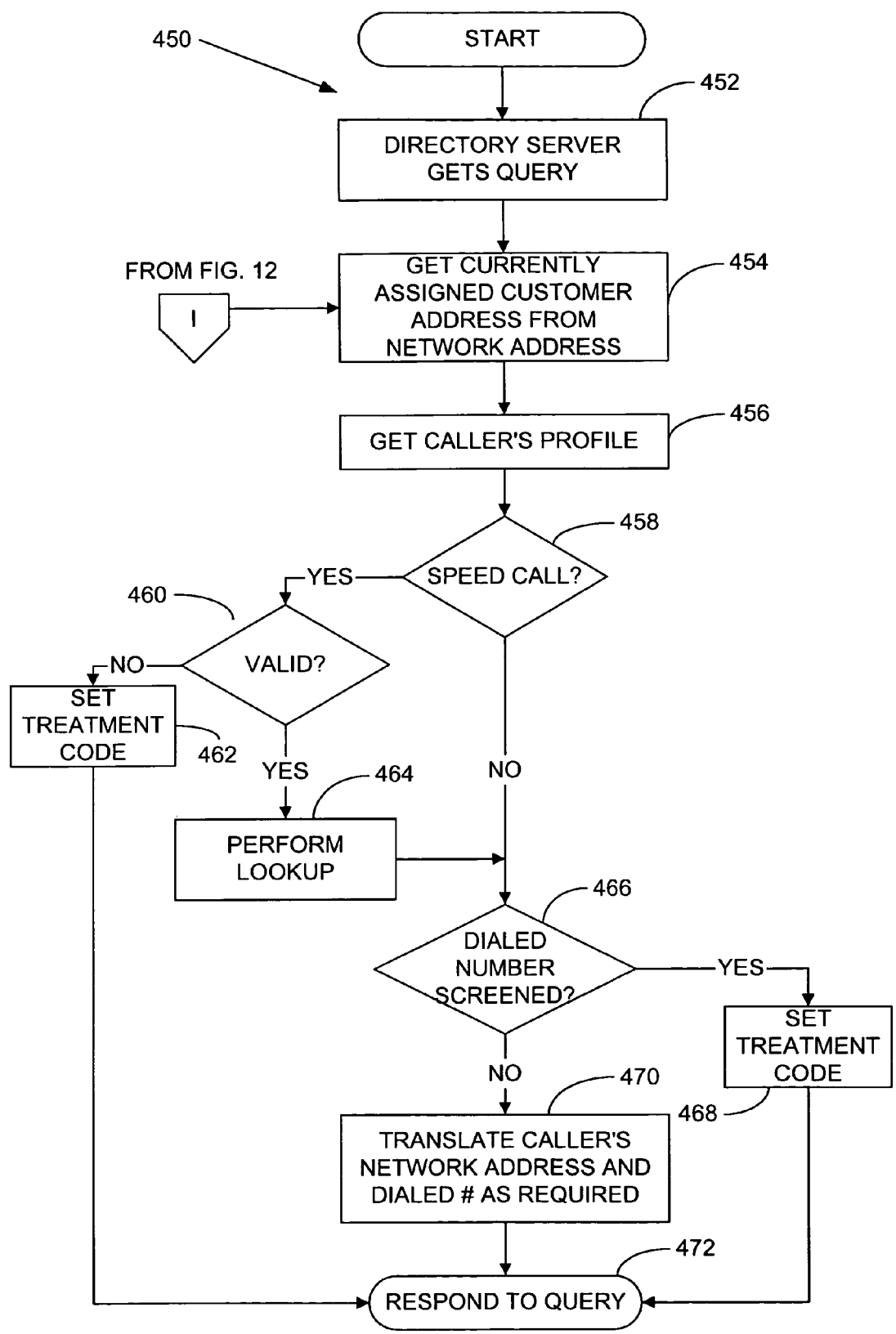
FIG. 9 is a flowchart illustrating a method for a translation decision in accordance with a preferred embodiment of the present invention.

FIG. 9 is flowchart illustrating a method 450 for an Address Translation Decision Tree according to a preferred embodiment of the present invention. The Directory Server receives the query at step 452 along with the caller's NA and the dialed number. The Directory Server gets the currently assigned CA from the NA at step 454. At step 456, the caller's profile is accessed. At step 458, it is determined if the dialed number has a speed call access code. If yes, then it is determined if the user has speed call and if the number is valid at step 460. If it is valid, then a lookup is performed on the user's speed call number and the one corresponding to the dialed code is substituted for the dialed number accessed. If not valid, then the caller gets a response indicating a treatment at step 462.

If at step 458, it has been determined that the dialed number does not have a speed call access code then call flow proceeds directly to step 466. Otherwise the speed call code is translated into a typical dialed number, as described herein before, then direction to step 466. At step 466 it is determined if the dialed number has been screened. If yes, then the caller gets a response indicating a treatment at step 468. If not, then, as required, the caller's CA is retrieved from step 454 and the dialed number is translated at step 470 for incorporation into the response to the query.

Service Portability

To illustrate the roaming functionality, assume that user "A" is going to roam from NA 313-555-2001 on gateway "X" to a phone in the office of an associate on gateway "Z". User "A" has a CA of 2001, which is assigned to the 313-555-2001 NA. The associate is identified as user "D" with an NA of 212-555-7951 and a CA of 7951.

In a preferred embodiment, user "A" begins a session by initiating a conversation with the "Portability Server". This is accomplished by dialing a service code. The call is routed to a Portability Server endpoint within the residential gateway in the usual way, except that the Directory Server recognizes the service code and declines to translate the NA of the calling station. Once this has been done, the caller is prompted for the assigned CA and a password. When the Portability Server has obtained and verified the information, it advised the local Directory Server that a roaming user has just logged on and provides the NA of 212-555-7951 and CA of 2001. The Directory Server gets the User Profile for 2001 and changes the current NA from 313-555-2001 to 212-555-7951. Then it sets a flag in the profile to show that this is not the assigned NA. The profile also contains a record of the user's assigned NA and this is not changed. The Directory Server then gets the NA for the endpoint and changes the current CA from 7951 to 2001, and it sets a flag in the NA to indicate the presence of a guest user. The Directory Server in gateway "Z" also issues a message with the relevant data to update all other Directory Servers in the private network. User "A" is now established at the new location with access to all CMS functions.

User "B" in gateway "X" dials 2001 to reach user "A". The Directory Server accesses the profile for 2001 and performs the translation to the 212-555-7951 NA. Since the profile for 2001 indicates the user has roamed, and the NA for 222-555-7951 confirms the presence of a guest user, the Directory Server request the call agents to process a normal call from user "B" to user "A". On the next call, user "B" dials 7951 to reach user "D". The profile for 7951 also points to 222-555-7951. Since the profile for 7951 has no indication of roaming and there is a guest user at the associated NA, the terminating call agent is requested to give default Call Forward All treatment to the incoming call. This ensures that calls for the station's assigned user are never presented to the guest user, and in fact receives appropriate "away from the office" treatment.

In a preferred embodiment a call from the PSTN to user "A", who has roamed away, presents a special problem since the called CA is not present on the call and is not directly available. In this case, the Directory Server finds the called NA and notes that the roaming flag has been set. This causes a lookup on the assigned CA, which appears as an attribute within the NA record. Thus, the dialed NA (313-555-2001) is translated to 2001 and presented for translation again, yielding the new NA of 212-555-7951. This allows the call to be completed properly through the private network. A call from the PSTN to user "D" causes the Directory Server to note the guest user flag. This results, in the call being given Call Forward All treatment. As before, this additional provision ensures that calls for the station's assigned user are handled properly in his absence.

In a particular embodiment, users who log on through the Portability Server are required to log off, or in an alternate embodiment, they are logged off automatically if there has been no activity for a pre-determined interval of time. Log off triggers the Directory Servers to revert the data in the NA and user profile, such that the current NA and CA are set equal to the assigned values.

Figure 10A:
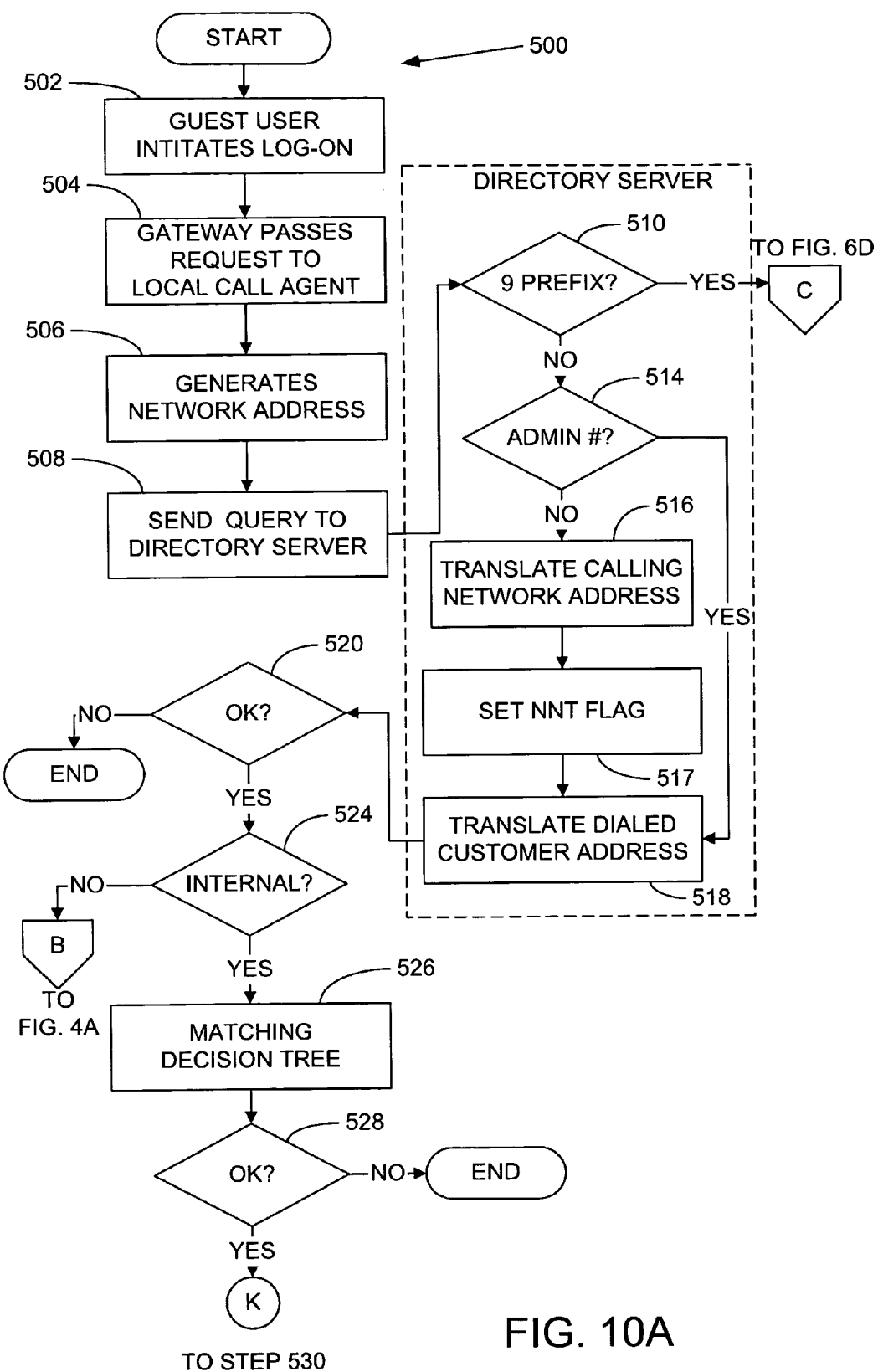
FIGS. 10A–10C are flowcharts illustrating a method for implementing service portability in accordance with a preferred embodiment of the present invention.
Figure 10B:
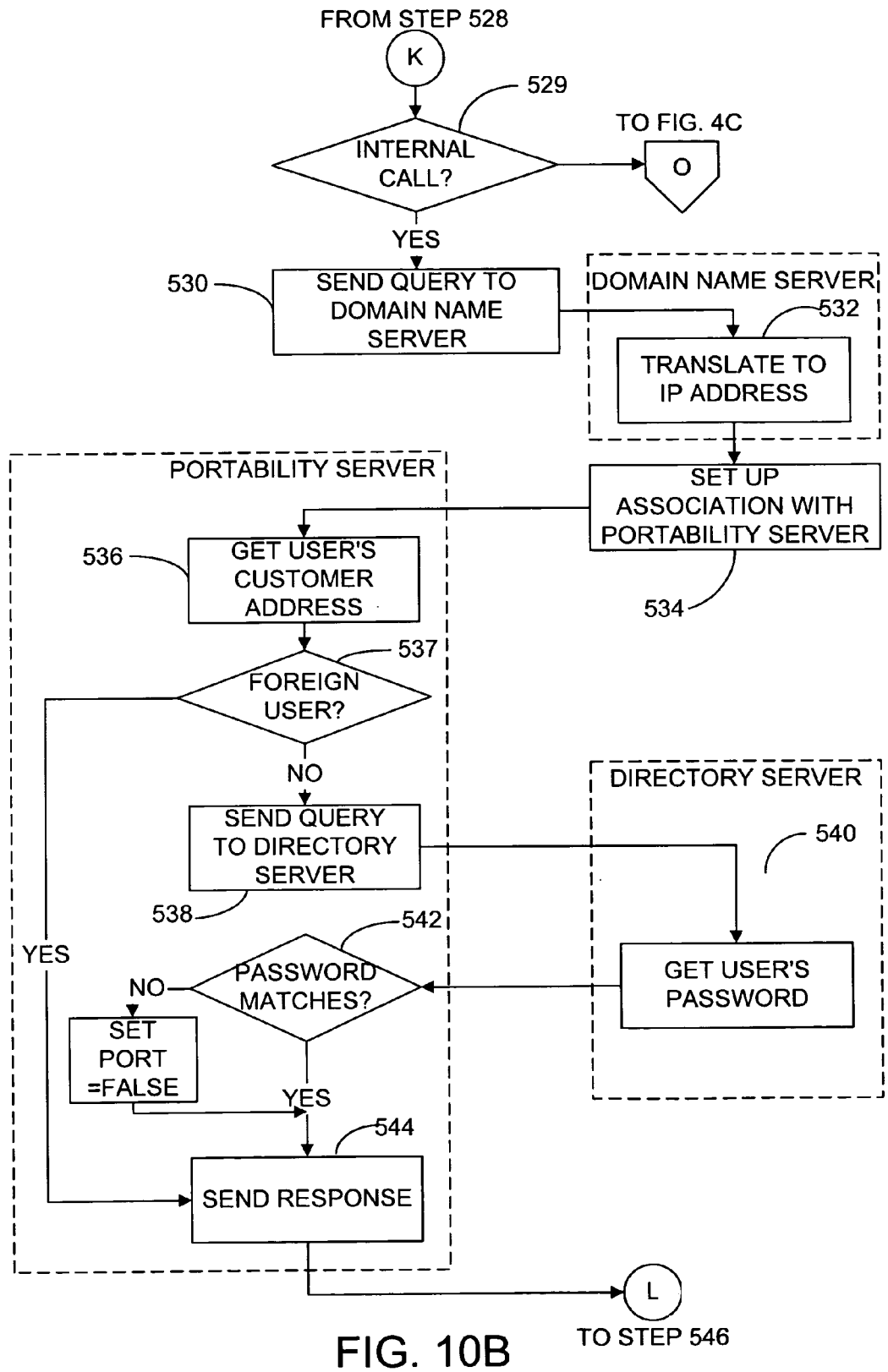
Figure 10C:
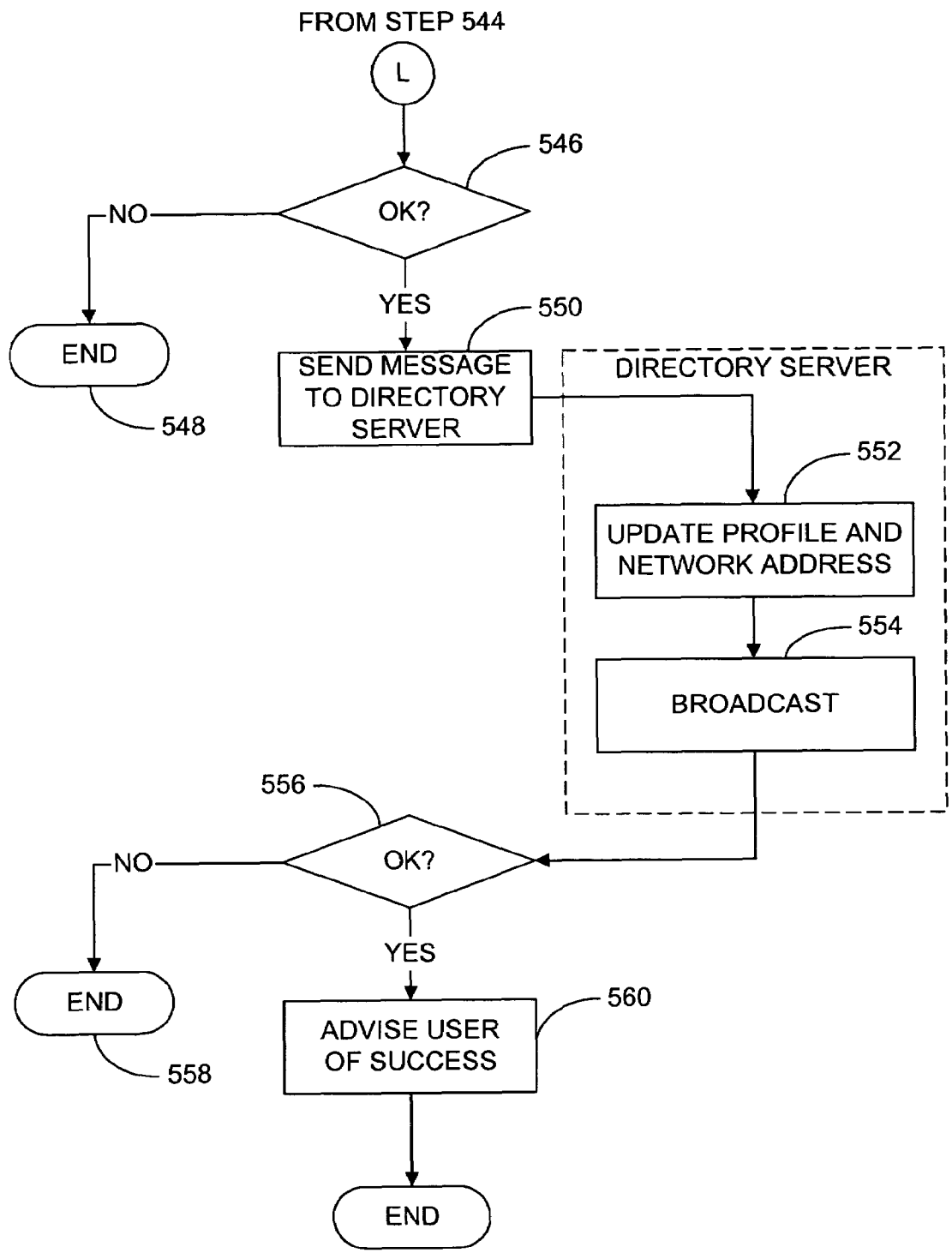

FIGS. 10A–10C are flowcharts illustrating a method for implementing service portability in accordance with a preferred embodiment of the present invention. The portability functionality introduces additional steps to several flowcharts, in particular FIGS. 4A and 4B, described herein before. These steps were omitted initially in the interest of simplicity. The guest user initiates a log-on procedure at step 502. The residential gateway passes the request to a local call agent at step 504. The call agent in step 506 generates a NA for the physical endpoint being used by the guest user. A query is then sent by the call agent to the Directory Server at step 508. The Directory Server determines in step 510 if the call is internal to the private network or not. If there is an escape code, the call is for an external destination and the call flow proceeds to FIG. 6D. Otherwise the flow proceeds to step 514. If at step 514 the dialed number is recognized as being an administration number assigned to the Portability Server, then the calling NA is not translated. The NA_Not_Translated (NNT) flag is set and the call flow proceeds to step 518. The calling NA is essential data that must be forwarded intact to the Portability Server. It is not appropriate to ask the guest user to supply the NA because it may not be evident, especially if the endpoint being used is in a conference room. This also eliminates the possibility of the user identifying the wrong NA, which could cause another user's incoming calls to be given treatment. If the dialed number is not recognized at step 514, this is an ordinary internal call: in this case the calling NA is translated in step 516 and the call flow proceeds from step 172 in FIG. 4A. Step 520 is a decision that is encountered by responses from the Directory Server to screen out failed call attempts that require treatment. In this case, for a call being directed to the Portability Server, the outcome is ok and the call flow proceeds to step 524. The method 500 then proceeds to the Matching Decision Tree in step 526 to evaluate the privileges of the called and calling party. In the method 500, the NA Note Translated (NNT) flag set by the Directory Server, transported in the response to the call agent, and forwarded to the Matching Decision Tree causes the calling NA to be substituted for the anticipated CA. Since the Matching Decision Tree is always encountered at this point in the call flow, it must be set by the system administrator to correctly handle calls to the Portability Server. In a particular embodiment where there is a restriction on calls from certain physical endpoints, and an appropriate voice announcement treatment is given when all the access ports to the Portability Server are in use. Once the outcome of the decision tree is checked at step 528 the call agent then sends a query to the Domain Name Server at step 530. The Domain Name Server translates the dialed NA to the local IP address of the Portability Server at step 532. At step 534, the call agent sets up a voice association with the Portability Server via the residential gateway. A voice path is needed so that the Portability Server can send voice prompts to the user and receive in-band tone signaling pulses in return. A coordinated signaling association is also set up between this server and the call agent to convey the call-related data, as identified herein. The Portability Server obtained a CA and password from the user in response to a prompt at step 536 and, given that this is not a foreign user as determined per step 537, sends a query to the Directory Server at step 538. Procedures for logging on foreign users are described herein after, in the sub section entitled, "Interworking in Native Mode". The Directory Server, at step 540, obtains the user's profile, extracts the password and provides it to the Portability Server. At step 542, the Portability Server compares the password obtained from the guest user with the password received from the Directory Server. If there is a failure to match, after a pre-determined number of attempts on the user's part to enter a valid password, the flow proceeds to step 544 with a response indicating the call should be aborted. If a match is obtained at step 542, the Portability Server sends a successful response to the call agent with the guest user's CA and current NA. Once the call agent verifies the response at step 546, it ends a message to the Directory Server at step 550 containing the guest user's CA and current NA, and requesting an update of the profile and NA to reflect the fact that the user has roamed to a new location. At step 552, the Directory Server updates the profile and NA and broadcasts the update at step 554. Assuming the update was determined to have been successful at step 556, the guest user is given a confirmation signal at step 560.

Figure 11:
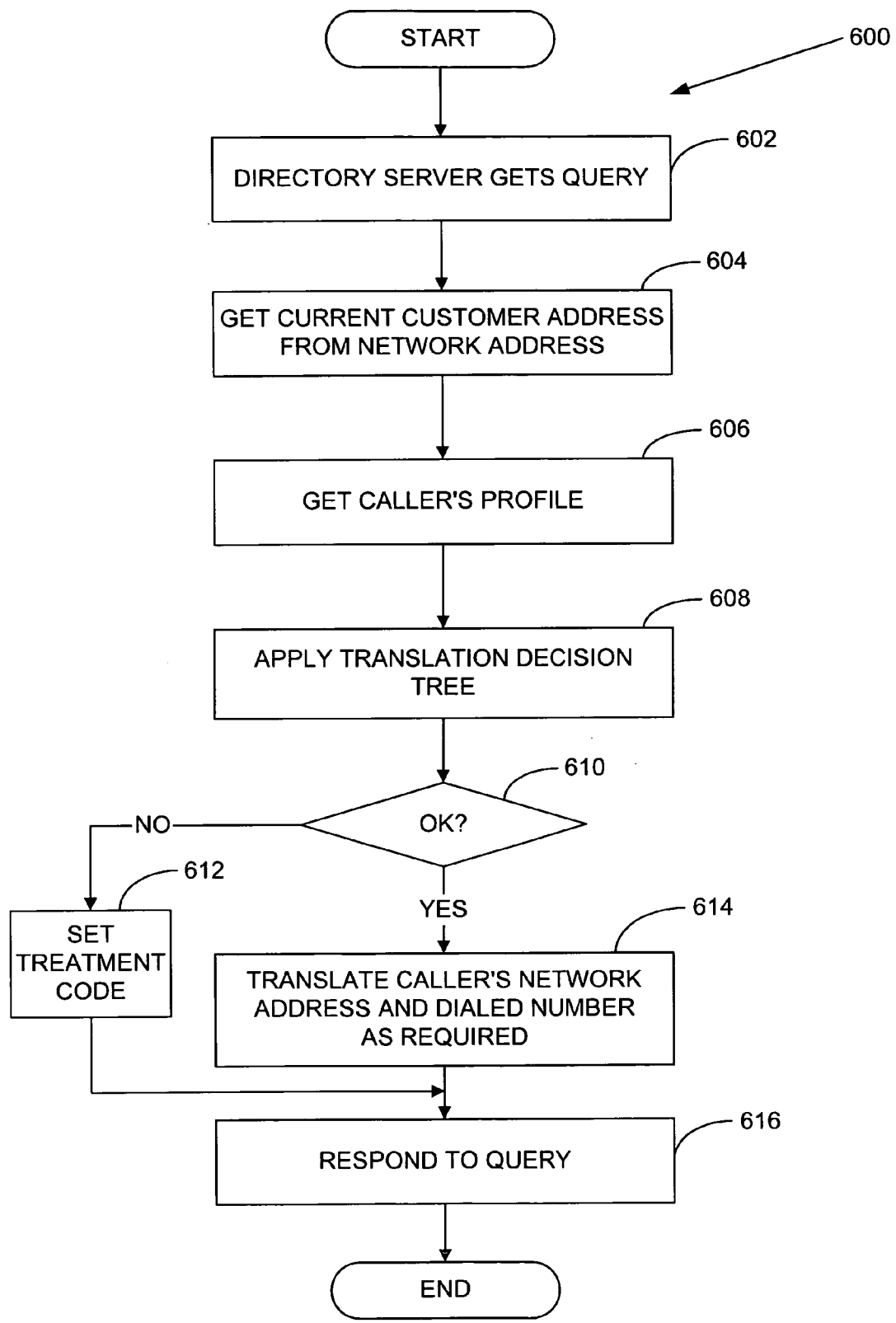
FIG. 11 is a flowchart illustrating a method for implementing service portability for an outgoing call in accordance with a preferred embodiment of the present invention.

FIG. 11 is a flowchart illustrating a method 600 for implementing service portability for an outgoing call in accordance with a preferred embodiment of the present invention. At step 602 the Directory Server gets a query from the call agent. The Directory Server translates the NA to obtain the current CA at step 604. The caller's profile is then obtained at step 606. The Address Translation Decision Tree, is then used at step 608 by the Directory Server. The Address Translation Decision Tree uses the information from the user's profile to apply a speed call code conversion, and to handle any number screening information contained therein, such as restrictions on long distance and overseas calling. This ensures that the speed call list and calling restrictions move with the caller to the new physical location. At step 614, the Directory Server translates the caller's NA and dialed number. At step 616 the Directory Server responds to the query. The call flow then proceeds from the Directory Server to step 172 in FIG. 4A.

Figure 12:
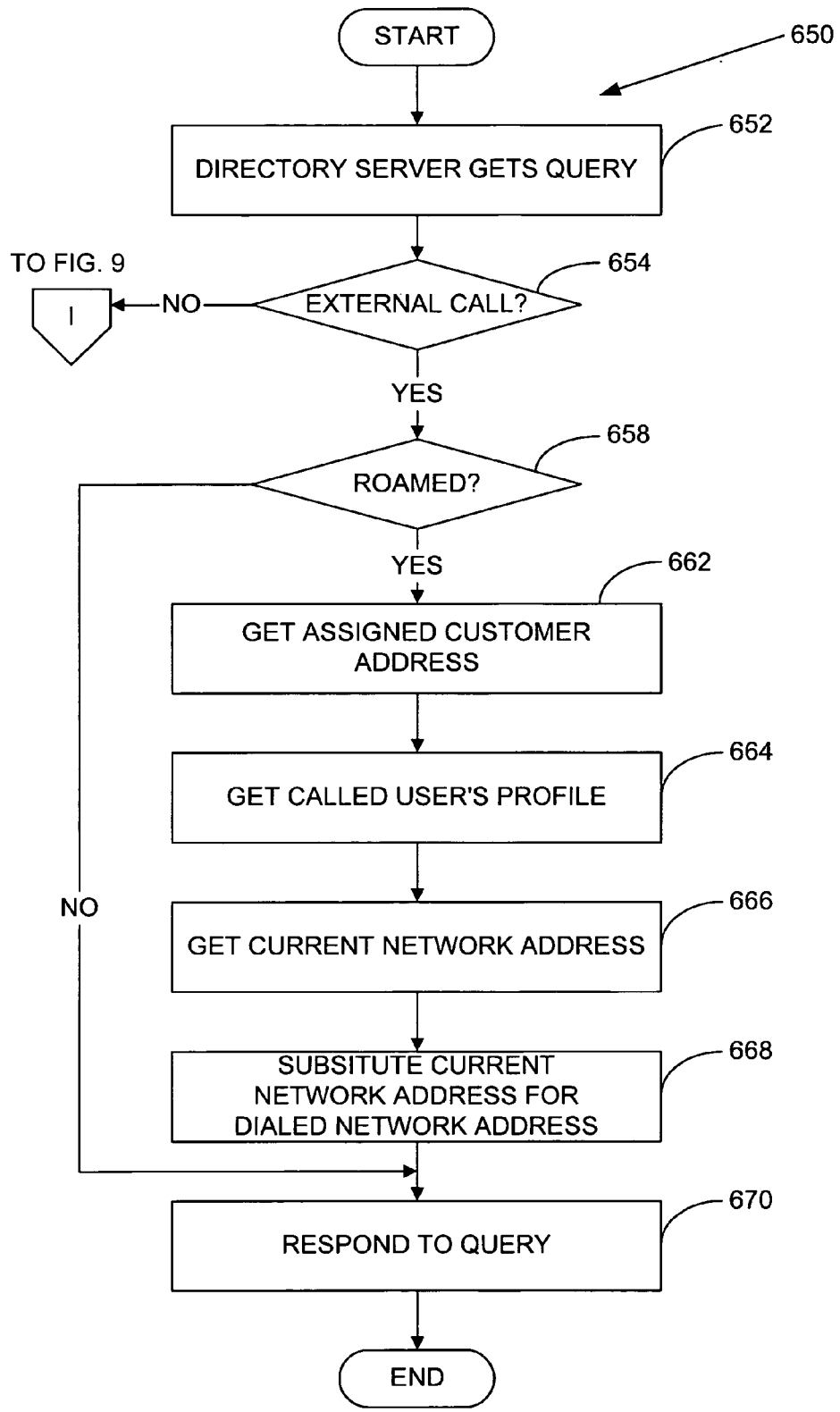
FIG. 12 is a flowchart illustrating a method for implementing service portability for an incoming call from a Public Switched Telephone Network using a Directory Server process in accordance with a preferred embodiment of the present invention.

FIG. 12 is a flowchart illustrating a method 650 for implementing service portability for an incoming call from a PSTN station using a Directory Server process in accordance with a preferred embodiment of the present invention. The Directory Server receives a query from the call agent as step 652. It determines if the call is an external call at step 654. If it is not, the call flow proceeds to step 454 on FIG. 9. The Directory server further determines if the called party has roamed in step 658. If the called party has not roamed, the call flow proceeds directly to step 670, as being successful, with no translation of the CA and NA, as would be expected from an ordinary outside call. The Directory Server gets the assigned CA in step 662 from a stored NA at step 666. The Directory Server then substitutes the current NA for the dialed NA at step 668, and completes a response to the call agent query in step 670.

Quality of Service

Quality of Service (QoS) is an important issue for customers of business services such as multi-location Centrex or its private network equivalent. They are generally wary of using VoIP as their primary method of voice communication. The system and method of the present invention treats the issue as one of paramount importance and offers four strategies to deal with it: continuous performance monitoring of the managed IP network as input to per-call routing decisions; optimization of facility selection between a managed IP network and the PSTN, such that traffic is shared and the balance adjusted to compensate for IP network loading; a fall-back scenario which allows the Centrex voice network to survive, even in the face of a total loss of the managed IP network; and reservation of IP network bandwidth for callers with sufficient privileges.

The distributed Directory Server architecture gives each node in the network full access to the status of all NAs and CAs. This presents the opportunity for a default routing scheme in that an inter-gateway call has two opportunities for number translation. If the originating gateway opportunity fails, causing the DS flag to remain false (or the token to be null), the terminating gateway will request an address translation from its Directory Server. Thus, a complete failure of the managed IP network can be accommodated with minimal short-term impact on the private network's voice services users. The following example, based on user "A" calling user "C", illustrates inter-gateway call setup in a situation where there has been a total failure of the managed IP network.

User "A" on IP gateway "X" dials 3001 to reach user "C" on gateway "Y". The originating call agent launches a query to the local Directory Server, which converts the CA (3001) to 709-555-3001. Upon receipt of the response, the originating call agent recognizes that the called party is within the private network, but at another gateway, gateway "Y". Accordingly, it composes a SIP person locator query for a call agent in gateway "Y". However, because the managed IP network has failed, there is no immediate response from the distant gateway and a timer in the origination call agent expires. The originating call agent abandons the person locator step and proceeds directly to the Routing Decision Tree. The failed status of the IP network may affect the outcome of the routing decision, particularly if user "A" has insufficient privileges to complete an internal Centex network call in an emergency situation. It is assumed that a decision is made to proceed with the call via the PSTN.

The originating call agent directs trunk gateway "X" to set up a PSTN call to the provided NA, which is equivalent to the Directory Number (DN) of the target endpoint. This is populated into the Called Party Number parameter of the SS7 Initial Address Message (IAM). Given the failure situation, there is no valid token for population into the Generic Name parameter, as would normally be done on inter-gateway calls within the private network. Instead, a null value is inserted.

Figure 13A:
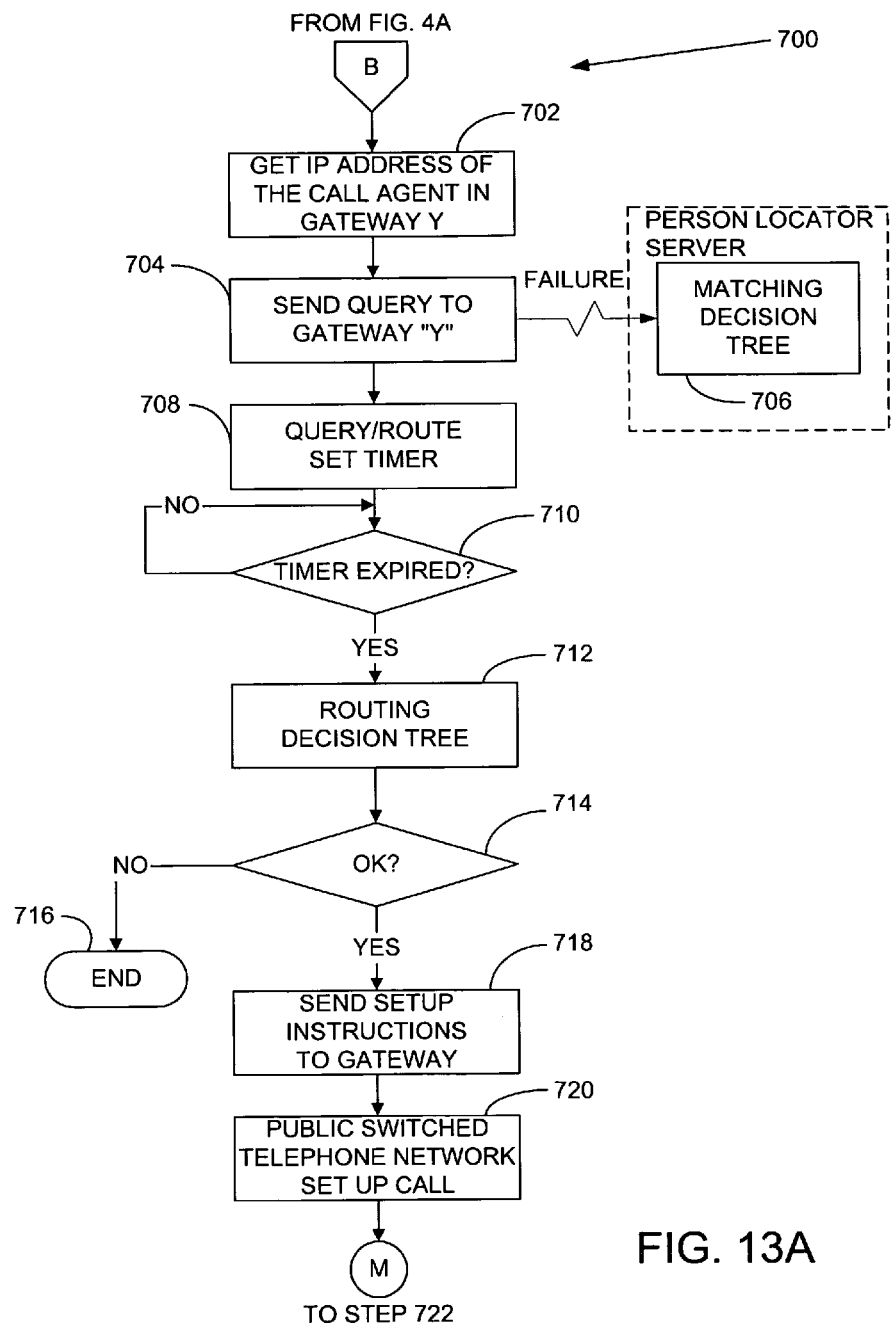
FIGS. 13A and 13B are flowcharts illustrating a method for default routing upon Internet Protocol (IP) network failure in accordance with a preferred embodiment of the present invention.
Figure 13B:
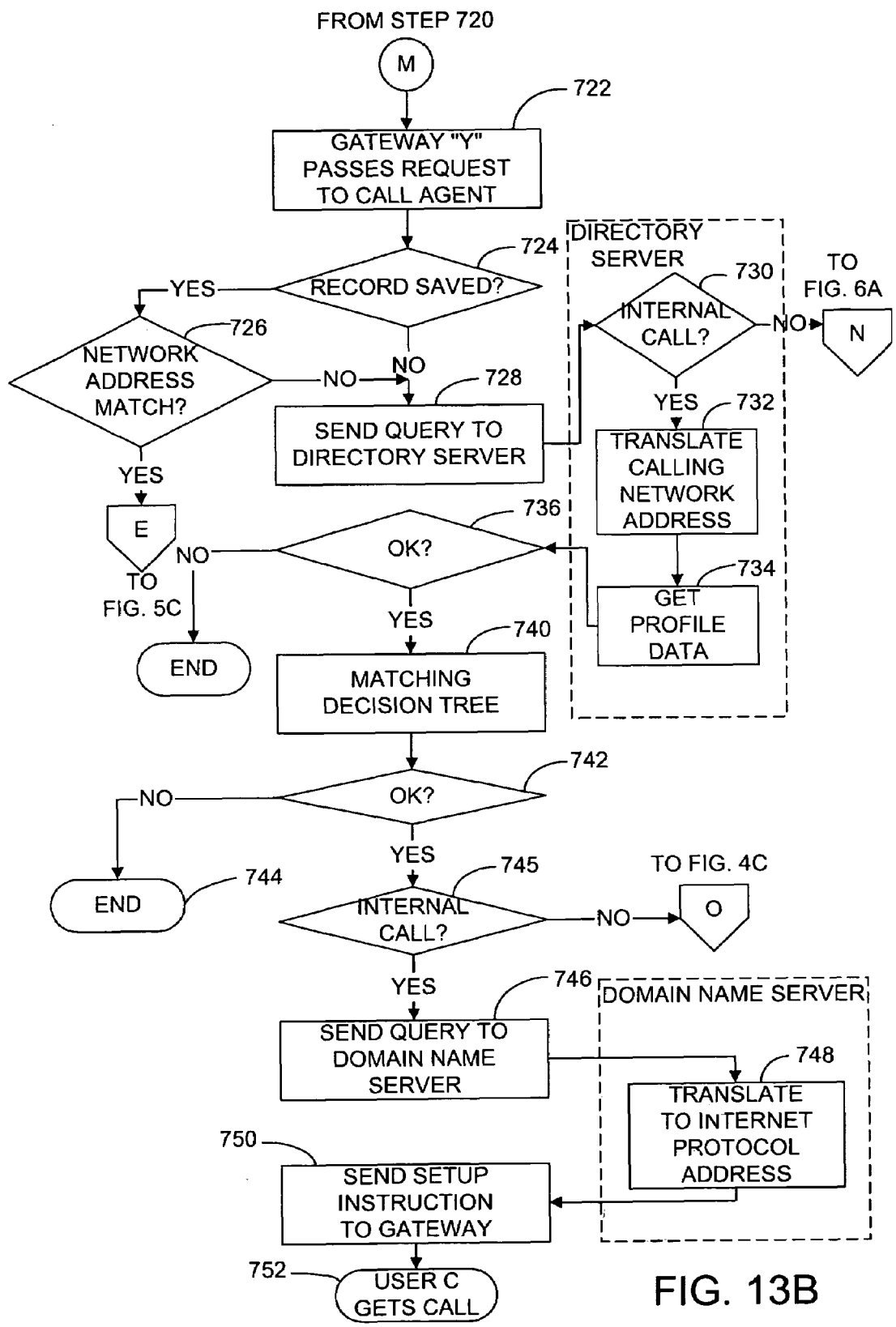

FIGS. 13A and 13B are flowcharts illustrating a method 700 for implementing default routing on an inter-gateway call in the call of IP network failure in accordance with a preferred embodiment of the present invention. The earlier steps of the flowcharts are the same as illustrated in FIG. 4A. User "A" on gateway "X" dials 3001 to reach user "C" on gateway "Y". The originating call agent launches a query to the local Directory Server, which converts the CA (3001) to 709-555-3001. Upon receipt of the response, the originating call agent recognizes that the called party is within the private network, but at another gateway, gateway "Y". Accordingly, in steps 702 and 704 it composes a SIP person locator query for a call agent in gateway "Y". However, because the managed IP network has failed, the query does not reach gateway "Y" in step 706 and there is no response. As is customary in all calls to an external agent, the originating call agent sets a timer upon launching the query and this is periodically tested for expiry in step 710. Eventually the timer expires and the originating call agent abandons the person locator step and proceeds directly to the Routing Decision Tree in step 712. The failed status of the IP network may affect the outcome of the routing decision, particularly if user "A" has insufficient privileges to complete an internal VPN or, in particular, a Centrex network call, in an emergency situation. It is assumed that a decision is made to proceed with the call via the PSTN.

In step 718 the originating call agent directs trunk gateway "X" to set up a PSTN call to the provided NA, which is equivalent to the Directory Number (DN) of the target endpoint. This is populated into the Called Party Number parameter of the SS7 Initial Address Message (IAM) and user "S's" NA is populated into the Calling Party Number parameter. Given the failure situation, there is no valid token for population into the Generic Name parameter, as would normally be done on inter-gateway calls within the private network. Instead, a null value is inserted.

The PSTN sets up the call between gateways in step 720. When the call is received at gateway "Y", it is not anticipated by the call agent associated with the DN, as would normally be the case for an internal call. This is because the person locator function was not performed. Accordingly, the call flow proceeds through steps 724 to 728, or through steps 724 and 726 to step 728. The flow having reached step 728 without encountering a matching record, the terminating call agent treats this as a new call and launches a query to its co-located Directory Server. By matching the caller's identity with an existing NA record in step 730, the Directory Server recognizes this as a call from within the private network. The null token confirms that a failure occurred and that a default routing translation needs to be made. Based on attributes within the NA record found in step 730, the Directory Server translates the caller's identity to a CA in step 732. The CA is used to access user "A's" profile in order to extract business unit identity and privileges, which otherwise would have been available in a matching call-in-progress record at step 726. The Default_Routing flag is set by the Directory Server and the response is sent back to the terminating call agent at step 736.

Assuming an acceptable outcome at step 736, the Default_Routing flag tells the call agent to negotiate the Matching Decision Tree at step 740. Normally, the terminating leg of an inter-gateway internal call would not need to negotiate the Matching Decision Tree, as this would already have been done during the person locator storage of the call flow. Assuming an acceptable outcome from the Matching Decision Tree, the call completes in the usual manner through steps 746, 748, 750, and 752.

The following degradations from the normal Quality of Service occur in the failure mode: roaming users cannot be logged off and on with an acceptable level of service portability; calls cannot be redirected at the source, if required which results in less efficient routing on forwarded calls; if the managed IP network is being used for VoIP, call handling capacity is reduced, more calls are given "no trunks available" treatment by the Routing Decision Tree; data transport is lost between gateways and multimedia calls are collapsed to become voice calls only; and advanced end-to-end features which rely on the power of IP signaling do not work. These degradations are considered tolerable from the viewpoint of basic voice services.

Interworking in Native Mode

A preferred embodiment of the present invention includes a method for handling calls between customer networks being served by the deployment of the system of this invention. This method permits a base level of person locator functionality such that a user can physically move from the home network to a plurality of others and have calls forwarded to those networks, without knowing the physical destination NA in advance.

In a preferred embodiment of the present invention, the "foreign" user, identified as John Smith calling from 416-555-5001, logs on at the Portability Server in one of the other networks in the following manner. At step 536 in FIG. 10B the Portability Server does not recognize this user's name. Assuming the network has been configured by the system administrator to allow foreign users to log on, the Portability Server enters into a conversation with the user to confirm his name and his intent to be registered on the network as a foreign user. At step 537, it is recognized by the Portability Server that a foreign user is being logged on. It sets a Foreign-User flag and causes the call flow to jump to step 544. The response back to the call agent contains the aforementioned flag and the user's name. The call agent then relays a message to the Directory Server in step 550, adding the foreign user's current NA. Recognizing the Foreign-User flag, the Directory Server creates a temporary user profile object for the foreign user with generic profile capabilities established by the system administrator for this type of user. The user name field contains "johnsmith" and the current network address contains 2125557951. This temporary record is purged automatically by the Directory Server after a user-settable interval. These temporary records for foreign users are differentiated from internal user profile objects so that searches on the user name key are kept in context. This prevents conflicts with internal user names. The system administrator may require that a naming convention be followed to prevent conflicts amongst foreign users.

Referring to FIG. 4C, and assuming the call flow has progressed to the point where the Matching Decision Tree in the originating network has provided an IP address, SIP person locator queries are launched towards the potential destination networks in step 196. As identified herein before the search key for the target user is identified as <sip: johnsmith@othercorp.com>. The destination networks' Directory Servers do the search, one of them finds the temporary record created earlier, and returns a PSTN Directory Number, which is 212-555-7951. The originating call agent then requests the trunk gateway to set up a PSTN call to the indicated phone number.

Unassigned Network Addresses

In a particular embodiment, an NA may have no assigned CA, for example, in an office move where the original CA has been reassigned elsewhere. In this preferred embodiment of the present invention, when the assigned user permanently moves to another location, and this transaction is authenticated by the system administrator, the system of the present invention automatically assigns a special user class to the NA. Based on a datafillable customer option, this calls can route all call attempts to the system administrator, using a call setup method identical to that used to reach the Portability Server. The system administrator can then extract the necessary information from the user to set up a new CA to NA association. This can be used to eliminate administrative overhead and delay when a new user moves into an existing office equipped with a phone jack, simply by having a prior authorization of the CA in an electronic file within the system.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

It will be apparent to those of ordinary skill in the art that methods involved in the system and method for providing call management services in a Virtual Private Network using Voice or Video over Internet Protocol may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A telephone network system for providing a private network comprising in combination:
   a Public Switched Telephone Network;
   an Internet Protocol Network in communication with the Public Switched Telephone Network using at least one of a trunk gateway, a call agent and a router; and
   a server-based interface for translating between at least one address on the Public Switched Telephone Network and at least one address on the Internet Protocol Network, wherein the server-based interface uses statically assigned customer addresses for calls between devices on the private network, wherein the server-based interface uses associations between the customer addresses and network addresses that are dynamically alterable, wherein the server-based interface uses static associations between the network addresses and Internet Protocol addresses, and wherein the telephone network system provides a caller with one of at least reservation of Internet Protocol network bandwidth and continuous performance monitoring of the Internet Protocol network as input to per-call routing decisions.

2. The telephone network system of claim 1, wherein the server-based interface includes a directory server, a domain name server, a proxy server and a portability server.

3. The telephone network system of claim 1, wherein the Public Switched Telephone Network and the Internet Protocol Network communicate using instructions provided to the trunk gateway by a client to agent protocol.

4. The telephone network system of claim 3, wherein the client to agent protocol is a Media Gateway Control Protocol.

* * * * *